United States Patent
Kim et al.

(10) Patent No.: US 11,797,142 B2
(45) Date of Patent: Oct. 24, 2023

(54) DISPLAY DEVICE

(71) Applicant: SAMSUNG DISPLAY CO., LTD., Yongin-si (KR)

(72) Inventors: Hyungbae Kim, Hwaseong-si (KR); Hyun-Wook Cho, Yongin-si (KR); Sangkook Kim, Cheonan-si (KR); Taejoon Kim, Seongnam-si (KR); Jaehyun Park, Hwaseong-si (KR); Jiyeong Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/054,939

(22) Filed: Nov. 14, 2022

(65) Prior Publication Data
US 2023/0185414 A1    Jun. 15, 2023

(30) Foreign Application Priority Data

Dec. 10, 2021    (KR) .......................... 10-2021-0176847

(51) Int. Cl.
*G06F 3/044*    (2006.01)
*G06F 3/041*    (2006.01)

(52) U.S. Cl.
CPC .......... *G06F 3/0446* (2019.05); *G06F 3/0412* (2013.01)

(58) Field of Classification Search
CPC ............................................ G06F 2203/04111
See application file for complete search history.

(56) References Cited

U.S. PATENT DOCUMENTS

| 8,982,078 | B2 | 3/2015 | Kim et al. | |
| 9,582,129 | B2 | 2/2017 | Kim | |
| 2012/0098762 | A1* | 4/2012 | Kim | G06F 3/0446 |
| | | | | 345/173 |
| 2013/0279063 | A1* | 10/2013 | Yoo | H01H 11/00 |
| | | | | 361/220 |
| 2014/0055383 | A1* | 2/2014 | Kim | G06F 3/0448 |
| | | | | 345/173 |

FOREIGN PATENT DOCUMENTS

| KR | 10-2015-0087632 | 7/2015 |
| KR | 10-1976089 | 5/2019 |

* cited by examiner

*Primary Examiner* — Robin J Mishler
(74) *Attorney, Agent, or Firm* — F. Chau & Associates, LLC

(57) ABSTRACT

A display device includes a display panel and an input sensing panel. The input sensing panel includes pluralities of first and second sensing electrodes and electrostatic induction patterns, each of which is connected to a sensing electrode from one of the pluralities of sensing electrodes and overlaps another sensing electrode from the other one of the pluralities of sensing electrodes. The input sensing panel includes a first area where deviations of mutual capacitances between the first and second sensing electrodes are small and a second area where the deviations are large. The electrostatic induction patterns include first electrostatic induction patterns disposed in the first area and second electrostatic induction patterns disposed in the second area, the second electrostatic induction patterns having a different area from the first electrostatic induction patterns, or the number of second electrostatic induction patterns being different from the number of first electrostatic induction patterns.

30 Claims, 28 Drawing Sheets

DISPLAY DEVICE

CROSS-REFERENCE TO RELATED APPLICATIONS

This application claims priority under 35 U.S.C. § 119 to Korean Patent Application No. 10-2021-0176847, filed on Dec. 10, 2021 in the Korean Intellectual Property Office, the disclosure of which is incorporated by reference herein in its entirety.

TECHNICAL FIELD

Embodiments of the present disclosure relate to a display device, and more particularly, to a display device having increased sensing sensitivity.

DISCUSSION OF RELATED ART

Multimedia electronic devices, such as televisions, mobile phones, tablet computers, navigation devices, game machines, etc., include display devices for displaying images. The display devices may include input sensors capable of providing a touch-based input method that enables a user to intuitively and conveniently input information or instructions, in addition to conventional input methods such as a button, a keyboard, a mouse, etc.

SUMMARY

Embodiments of the present disclosure provide a display device including an input sensing panel having increased sensing sensitivity.

According to an embodiment, a display device includes a display panel that displays an image and an input sensing panel disposed on the display panel. The input sensing panel includes a plurality of first sensing electrodes, a plurality of second sensing electrodes disposed adjacent to the first sensing electrodes, and a plurality of electrostatic induction patterns, each of which is connected to a sensing electrode from one of the pluralities of first and second sensing electrodes and overlaps another sensing electrode from the other one of the pluralities of first and second sensing electrodes.

In an embodiment, the input sensing panel includes a first area where deviations of mutual capacitances between the first sensing electrodes and the second sensing electrodes are relatively small and a second area where the deviations of the mutual capacitances are relatively large. The electrostatic induction patterns include first electrostatic induction patterns disposed in the first area and second electrostatic induction patterns disposed in the second area, the second electrostatic induction patterns having a different area from the first electrostatic induction patterns, or the number of second electrostatic induction patterns being different from the number of first electrostatic induction patterns.

According to an embodiment, a display device includes a display panel that displays an image and an input sensing panel disposed on the display panel. The input sensing panel includes a plurality of first sensing electrodes, a plurality of second sensing electrodes disposed adjacent to the first sensing electrodes, and a plurality of compensation patterns, each of which is connected to a sensing electrode from one of the pluralities of first and second sensing electrodes and overlaps another sensing electrode from the other one of the pluralities of first and second sensing electrodes.

In an embodiment, the input sensing panel includes a non-compensation area where mutual capacitances between the first sensing electrodes and the second sensing electrodes are relatively high and a compensation area where the mutual capacitances are relatively low. The compensation patterns are disposed in the compensation area and are not disposed in the non-compensation area.

According to an embodiment, a display device includes a display panel that displays an image and an input sensing panel disposed on the display panel. The input sensing panel includes a plurality of first sensing electrodes, a plurality of second sensing electrodes disposed adjacent to the first sensing electrodes, and a plurality of electrostatic induction patterns, each of which is connected to a sensing electrode from one of the pluralities of first and second sensing electrodes and overlaps another sensing electrode from the other one of the pluralities of first and second sensing electrodes.

In an embodiment, the input sensing panel includes a non-compensation area where mutual capacitances between the first sensing electrodes and the second sensing electrodes are relatively high and a compensation area where the mutual capacitances are relatively low. The electrostatic induction patterns include first electrostatic induction patterns disposed in the non-compensation area and second electrostatic induction patterns disposed in the compensation area, the second electrostatic induction patterns having a different area from the first electrostatic induction patterns, or the number of second electrostatic induction patterns being different from the number of first electrostatic induction patterns.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
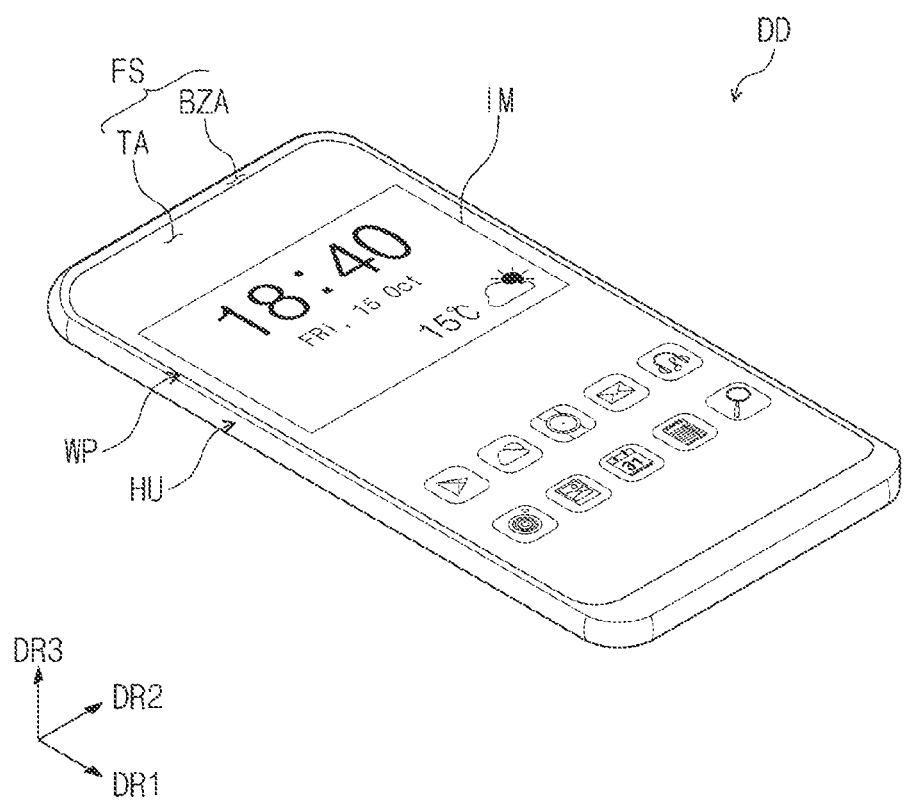
FIG. 1 is a perspective view of a display device according to an embodiment of the present disclosure.

Embodiments of the present disclosure will be described more fully hereinafter with reference to the accompanying drawings. Like reference numerals may refer to like elements throughout the accompanying drawings.

It will be understood that when a component such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

As used herein, the term "and/or" includes all of one or more combinations defined by related components.

Terms such as first, second, etc. may be used to describe various components, but the components should not be limited by these terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Figure 2:
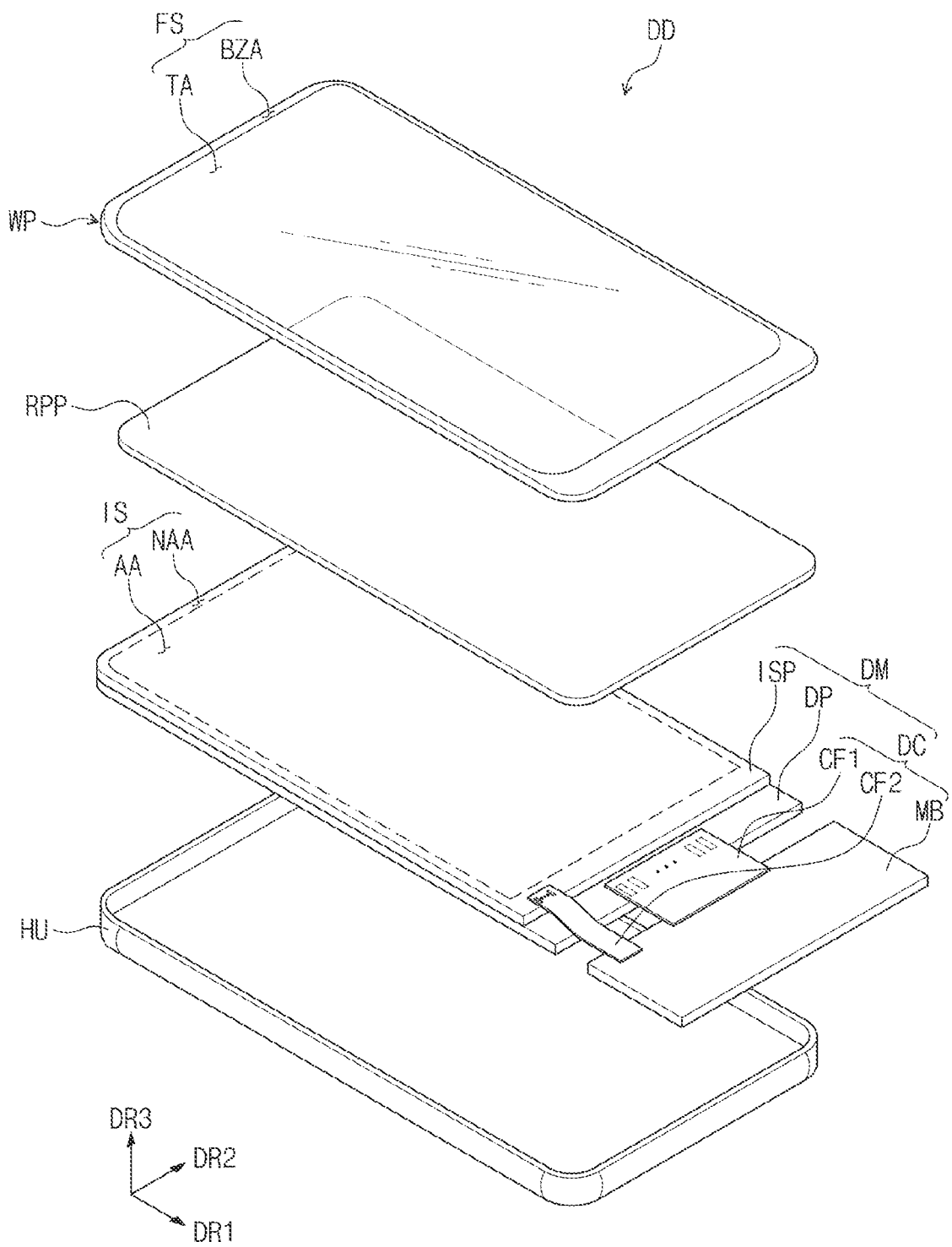
FIG. 2 is an exploded perspective view of the display device according to an embodiment of the present disclosure.

FIG. 1 is a perspective view of a display device according to an embodiment of the present disclosure. FIG. 2 is an exploded perspective view of the display device according to an embodiment of the present disclosure.

Referring to FIGS. 1 and 2, the display device DD may be a device that is activated in response to an electrical signal. The display device DD may include various embodiments. For example, the display device DD may be used not only for large display devices, such as, for example, a television, a monitor, and outdoor signage, but also for small and medium-sized display devices, such as, for example, a personal computer, a notebook computer, a personal digital terminal, a car navigation unit, a game machine, a portable electronic device, and a camera. However, these are merely illustrative, and the display device DD may be employed for other types of display devices. In embodiments described herein, the display device DD is exemplified as being a smartphone.

The display device DD may display an image IM in a third direction DR3 on a display surface FS parallel to a first direction DR1 and a second direction DR2. The image IM may include a still image as well as a dynamic image. In FIG. 1, a clock window and icons are illustrated as examples of the image IM. The display surface FS on which the image IM is displayed may correspond to the front surface of the display device DD and may correspond to the front surface of a window WP.

In an embodiment, front surfaces (or upper surfaces) and rear surfaces (or lower surfaces) of members are defined based on the direction in which the image IM is displayed. The front surfaces and the rear surfaces may be opposite each other in the third direction DR3, and the normal directions of the front surfaces and the rear surfaces may be parallel to the third direction DR3. The directions indicated by the first, second, and third directions DR1, DR2, and DR3 may be relative concepts and may be changed to different directions. As used herein, the expression "on a plane" may mean viewed in the third direction DR3.

The display device DD may include the window WP, an anti-reflection film RPP, a display module DM, and a housing HU. In an embodiment, the window WP and the housing HU may be combined with each other to form the exterior of the display device DD.

The window WP may contain an optically transparent insulating material. For example, the window WP may contain glass or plastic. The window WP may have a multi-layer structure or a single-layer structure. For example, the window WP may include a plurality of plastic films coupled through an adhesive, or may include a glass substrate and a plastic film coupled through an adhesive.

The display surface FS of the window WP may define the front surface of the display device DD as described above. The display surface FS may include a transmissive area TA and a bezel area BZA. The transmissive area TA may be an optically transparent area. For example, the transmissive area TA may be an area having a visible light transmittance of about 90% or more. The bezel area BZA may be an area having a lower light transmittance than the transmissive area TA. The bezel area BZA may define the shape of the transmissive area TA. The bezel area BZA may be disposed adjacent to the transmissive area TA and may surround the transmissive area TA. The bezel area BZA may have a predetermined color. According to embodiments, in the window WP, the bezel area BZA may be omitted.

The anti-reflection film RPP may be disposed under the window WP. The anti-reflection film RPP may decrease the reflectivity of external light incident from above the window WP. According to an embodiment of the present disclosure, the anti-reflection film RPP may be omitted and may be a component included in the display module DM.

The display module DM may display the image IM and may sense an external input. The display module DM may include a front surface IS including an active area AA and a peripheral area NAA. The active area AA may be an area that is activated in response to an electrical signal.

In an embodiment, the active area AA may be an area where the image IM is displayed and may be an area where the external input is sensed. The transmissive area TA may overlap the active area AA. For example, the transmissive area TA may overlap all or at least part of the active area AA. Accordingly, a user may visually recognize the image IM through the transmissive area TA, or may provide the external input through the transmissive area TA.

The peripheral area NAA may be disposed adjacent to the active area AA. The peripheral area NAA may surround the active area AA. A drive circuit or a drive line for driving the active area AA may be disposed in the peripheral area NAA.

The peripheral area NAA may be an area covered by the bezel area BZA. The bezel area BZA may cover the peripheral area NAA of the display module DM to interrupt visibility of the peripheral area NAA from outside of the display device DD.

The display module DM may include a display panel DP, an input sensing panel ISP, and a drive circuit DC.

The display panel DP may be a component that substantially generates the image IM. The image IM generated by the display panel DP may be visible to the user through the transmissive area TA.

The input sensing panel ISP may provide an external input applied from outside of the display device DD. The input sensing panel ISP may sense an external input provided from outside of the display device DD through the transmissive area TA.

The drive circuit DC may be electrically connected to the display panel DP and the input sensing panel ISP. The drive circuit DC may include a main circuit board MB, a first flexible film CF1, and a second flexible film CF2.

The first flexible film CF1 may be electrically connected to the display panel DP. The first flexible film CF1 may connect the display panel DP and the main circuit board MB. The first flexible film CF1 may be connected to pads (display pads) of the display panel DP disposed in the peripheral area NAA. The first flexible film CF1 may provide an electrical signal for driving the display panel DP to the display panel DP. The electrical signal may be generated by the first flexible film CF1, or may be generated by the main circuit board MB.

The second flexible film CF2 may be electrically connected to the input sensing panel ISP. The second flexible film CF2 may connect the input sensing panel ISP and the main circuit board MB. The second flexible film CF2 may be connected to pads (sensing pads) of the input sensing panel ISP disposed in the peripheral area NAA. The second flexible film CF2 may provide an electrical signal for driving the input sensing panel ISP to the input sensing panel ISP. The electrical signal may be generated by the second flexible film CF2, or may be generated by the main circuit board MB.

The main circuit board MB may include various types of drive circuits for driving the display module DM or a connector for supplying power. The first flexible film CF1 and the second flexible film CF2 may be connected to the main circuit board MB. The display module DM according to an embodiment of the present disclosure may be efficiently controlled through the one main circuit board MB. However, this is illustrative, and in a display module DM according to an embodiment of the present disclosure, a display panel DP and an input sensing panel ISP may be connected to different main circuit boards, and one of a first flexible film CF1 and a second flexible film CF2 is not connected to a main circuit board MB.

The housing HU may be coupled to the window WP. The housing HU may be coupled to the window WP to provide a predetermined inner space. The display module DM may be accommodated in the inner space.

The housing HU may contain a material having a relatively high rigidity. For example, the housing HU may contain glass, plastic, or metal, or may include a plurality of frames and/or plates formed of a combination of the mentioned materials. The housing HU may stably protect components of the display device DD accommodated in the inner space from an external impact.

Figure 3A:
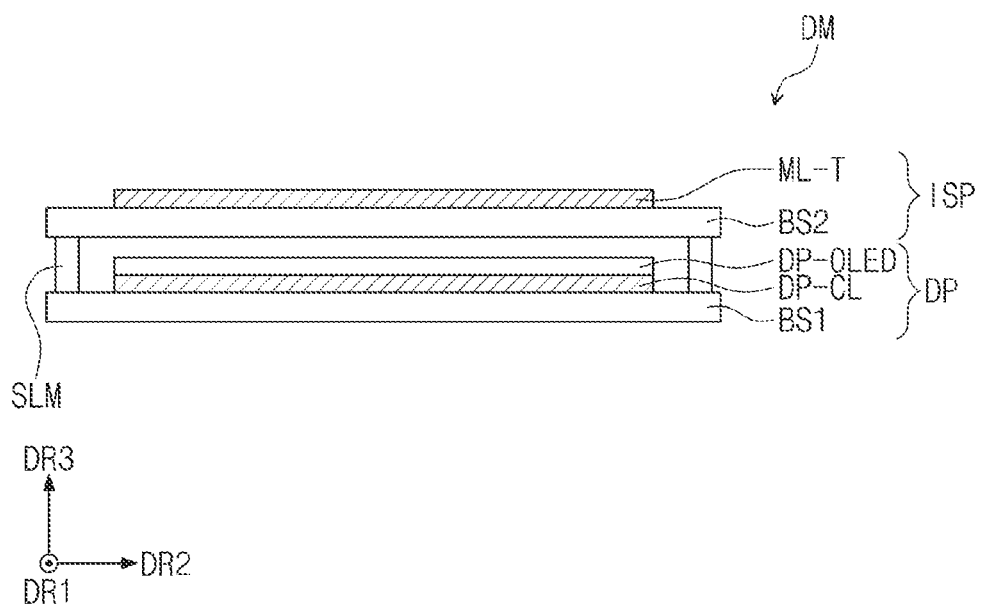
FIG. 3A is a cross-sectional view of a display module according to an embodiment of the present disclosure.

FIG. 3A is a cross-sectional view of a display module according to an embodiment of the present disclosure.

Referring to FIG. 3A, the display module DM may include the display panel DP, the input sensing panel ISP, and a coupling member SLM.

The display panel DP may include a first base layer BS1, a display circuit layer DP-CL, and a display element layer DP-OLED. The input sensing panel ISP may include a second base layer BS2 and a sensing circuit layer ML-T.

Each of the first base layer BS1 and the second base layer BS2 may be, for example, a silicon substrate, a plastic substrate, a glass substrate, an insulating film, or a stacked structure including a plurality of insulating layers.

The display circuit layer DP-CL may be disposed on the first base layer BS1. The display circuit layer DP-CL may include a plurality of insulating layers, a plurality of conductive layers, and a semiconductor layer. The plurality of conductive layers of the display circuit layer DP-CL may constitute signal lines or a pixel control circuit.

The display element layer DP-OLED may be disposed on the display circuit layer DP-CL. The display element layer DP-OLED may include light emitting elements. For example, the display element layer DP-OLED may include organic light emitting diodes, inorganic light emitting diodes, quantum dots, quantum rods, micro-LEDs, or nano-LEDs.

The second base layer BS2 may be disposed over the display element layer DP-OLED. A predetermined space may be defined between the second base layer BS2 and the display element layer DP-OLED. The space may be filled with air or an inert gas. Furthermore, in an embodiment of the present disclosure, the space may be filled with a filling material such as, for example, a silicon-based polymer, an epoxy-based resin, or an acrylic resin.

The coupling member SLM may be disposed between the first base layer BS1 and the second base layer BS2. The coupling member SLM may couple the first base layer BS1 and the second base layer BS2. The coupling member SLM may contain an organic material, such as, for example, a photocurable resin or a photoplastic resin, or may contain an inorganic material, such as, for example, a frit seal. However, the coupling member SLM is not limited thereto.

The sensing circuit layer ML-T may be disposed on the second base layer BS2. The sensing circuit layer ML-T may include a plurality of insulating layers and a plurality of conductive layers. The plurality of conductive layers may constitute sensing electrodes for sensing an external input, sensing lines electrically connected to the sensing electrodes, and sensing pads electrically connected to the sensing lines. A specific structure of the sensing circuit layer ML-T according to an embodiment of the present disclosure will be described below.

Figure 3B:
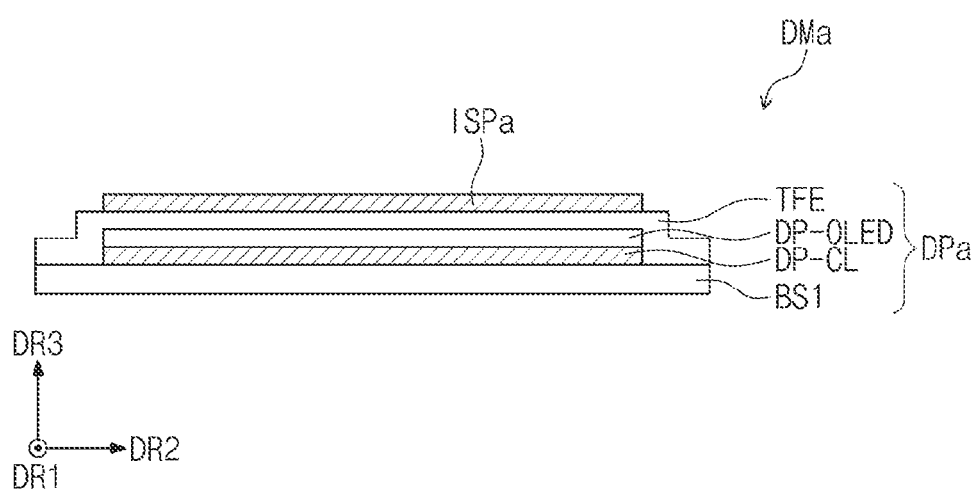
FIG. 3B is a cross-sectional view of a display module according to an embodiment of the present disclosure.

FIG. 3B is a cross-sectional view of a display module according to an embodiment of the present disclosure.

Referring to FIG. 3B, the display module DMa may include a display panel DPa and an input sensing panel ISPa. The input sensing panel ISPa may be referred to as the input sensing layer.

The display panel DPa may include a first base layer BS1, a display circuit layer DP-CL, a display element layer DP-OLED, and an encapsulation layer TFE. The input sensing panel ISPa may be disposed on the encapsulation layer TFE. According to an embodiment of the present disclosure, the display panel DPa and the input sensing panel ISPa may be formed through a continuous process. That is, the input sensing panel ISPa may be directly formed on the encapsulation layer TFE.

Figure 4:
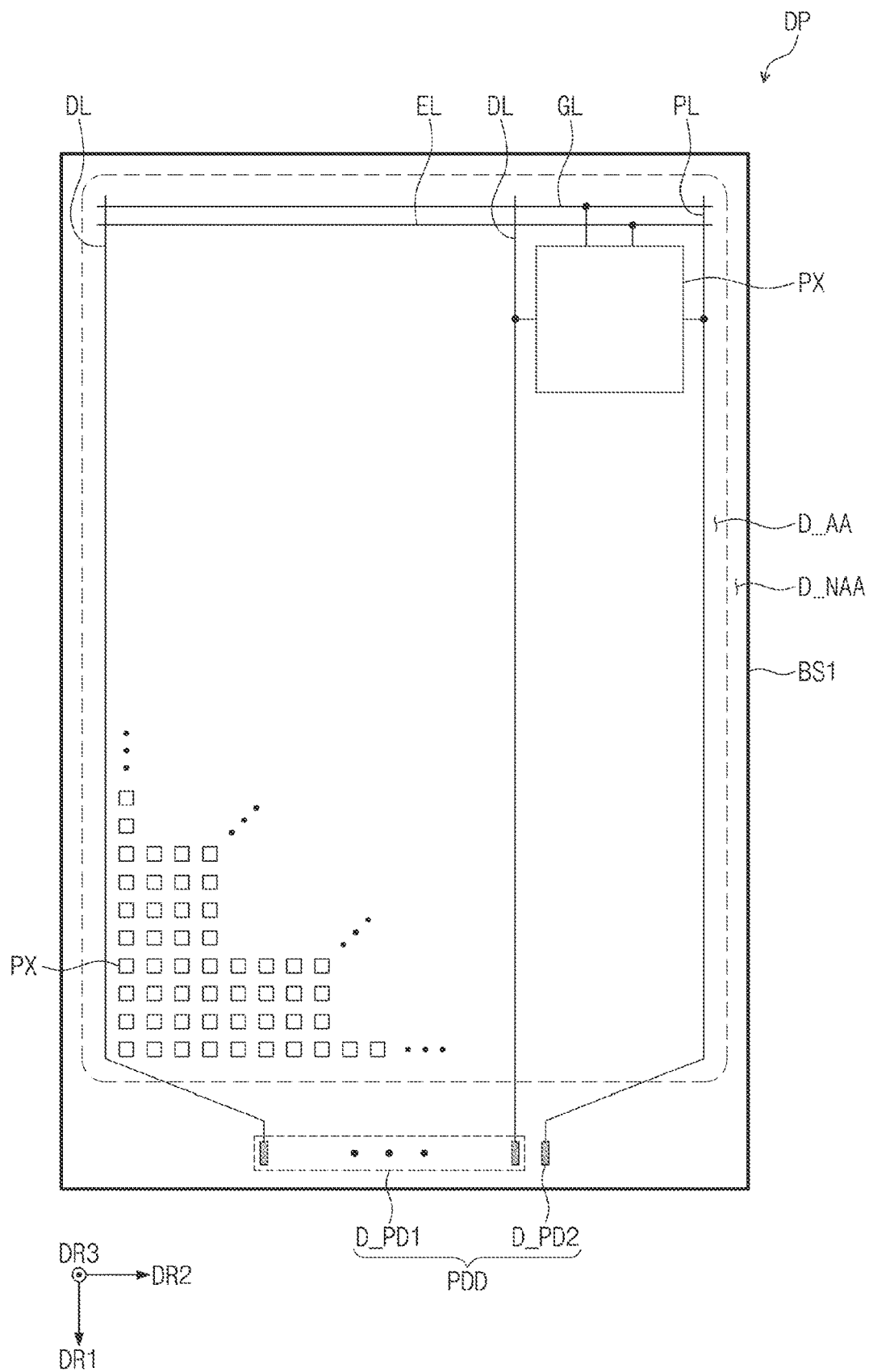
FIG. 4 is a plan view of a display panel according to an embodiment of the present disclosure.

FIG. 4 is a plan view of a display panel according to an embodiment of the present disclosure.

Referring to FIG. 4, the display panel DP may include a plurality of pixels PX, a plurality of signal lines GL, DL, PL, and EL, and a plurality of display pads PDD.

An active area D_AA of the display panel DP may be an area where an image is displayed, and a peripheral area D_NAA of the display panel DP may be an area where a drive circuit or a drive line is disposed and in which an image is not displayed. The plurality of pixels PX may be disposed in the active area D_AA. The active area D_AA may correspond to the active area AA of the display module DM illustrated in FIG. 2, and the peripheral area D_NAA may correspond to the peripheral area NAA of the display module DM illustrated in FIG. 2.

The plurality of signal lines GL, DL, PL, and EL may be connected to the pixels PX and may transfer electrical signals to the pixels PX. In FIG. 4, among signal lines GL, DL, PL, and EL included in the display panel DP, the scan lines GL, the data lines DL, the power line PL, and the light emission control lines EL are illustrated. However, this is illustrative, and the signal lines GL, DL, PL, and EL according to an embodiment of the present disclosure may further include an additional line(s) such as, for example, an initialization voltage line.

The display pads PDD may include a first display D_PD1 and a second display pad D_PD2. A plurality of first display pads D_PD1 may be provided. The first display pads D_PD1 may be connected to the data lines DL, respectively. The second display pad D_PD2 may be electrically connected to the power line PL. The display panel DP may provide electrical signals provided from outside of the display panel DP through the display pads PDD to the pixels PX. The display pads PDD may further include pads for receiving other electrical signals, in addition to the first display pads D_PD1 and the second display pad D_PD2, and are not limited thereto.

Figure 5:
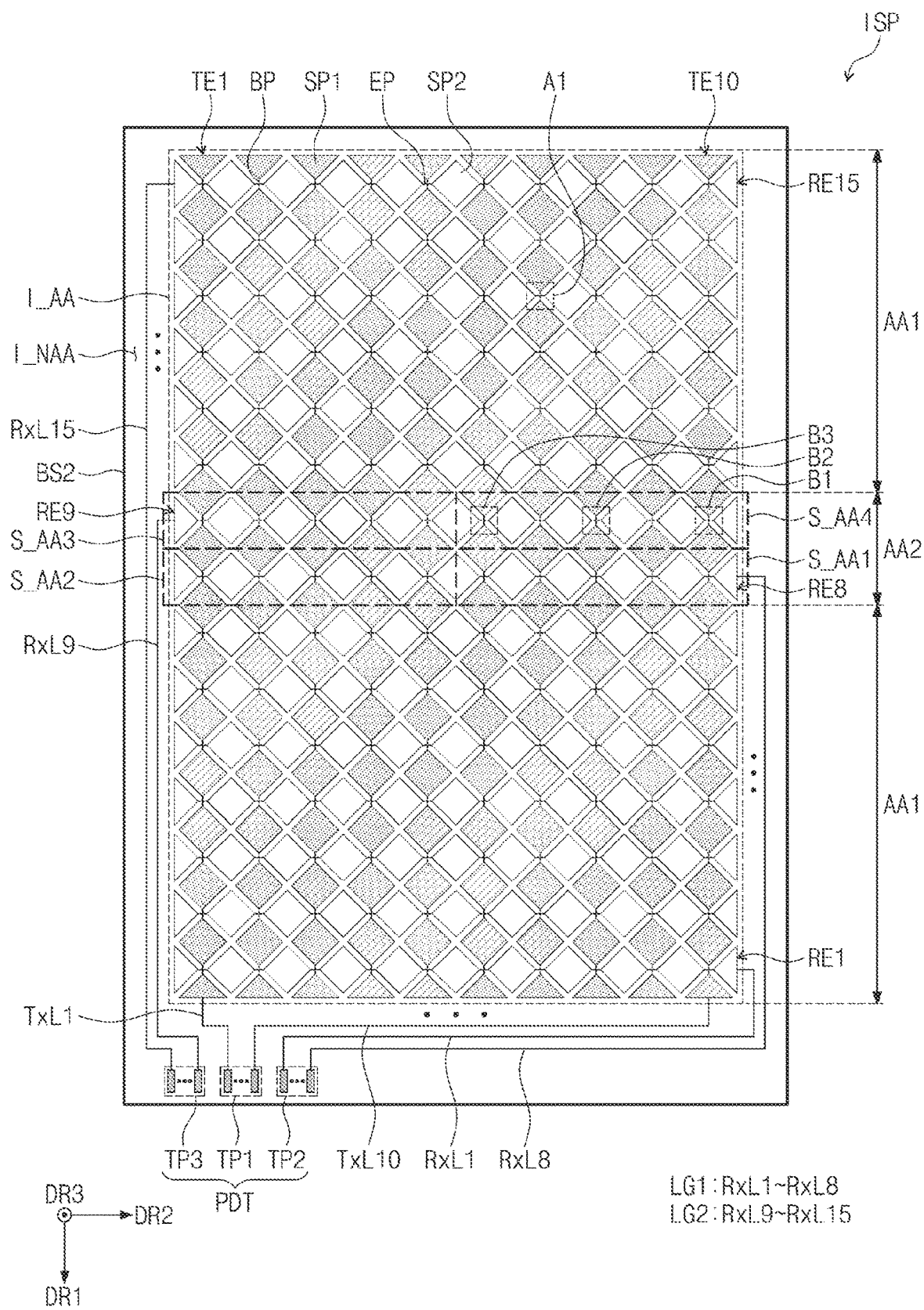
FIG. 5 is a plan view of an input sensing panel according to an embodiment of the present disclosure.

FIG. 5 is a plan view of an input sensing panel according to an embodiment of the present disclosure.

Referring to FIG. 5, the input sensing panel ISP may include the second base layer BS2, a plurality of transmitting electrodes TE1 to TE10 (also referred to as the first sensing electrodes), a plurality of receiving electrodes RE1 to RE15 (also referred to as the second sensing electrodes), a plurality of transmitting lines TxL1 to TxL10 (also referred to as the first signal lines), a plurality of receiving lines RxL1 to RxL15 (also referred to as the second signal lines), and a plurality of sensing pads PDT. The plurality of transmitting electrodes TE1 to TE10, the plurality of receiving electrodes RE1 to RE15, the plurality of transmitting lines TxL1 to TxL10, the plurality of receiving lines RxL1 to RxL15, and the plurality of sensing pads PDT may constitute the sensing circuit layer ML-T (refer to FIG. 3A).

An active area I_AA and a peripheral area I_NAA disposed adjacent to the active area I_AA may be defined in the second base layer BS2. The peripheral area I_NAA may surround the active area I_AA. The active area I_AA may correspond to the active area AA of the display module DM illustrated in FIG. 2, and the peripheral area I_NAA may correspond to the peripheral area NAA of the display module DM illustrated in FIG. 2.

The plurality of transmitting electrodes TE1 to TE10 and the plurality of receiving electrodes RE1 to RE15 may be disposed in the active area I_AA. The input sensing panel ISP may obtain information about an external input through a change in capacitances between the transmitting electrodes TE1 to TE10 and the receiving electrodes RE1 to RE15 (hereinafter referred to as the mutual capacitances). Although the ten transmitting electrodes TE1 to TE10 and the fifteen receiving electrodes RE1 to RE15 are illustrated in FIG. 5, this is illustrative, and the number of transmitting electrodes and the number of receiving electrodes are not limited thereto.

Each of the transmitting electrodes TE1 to TE10 may extend in the first direction DR1. The transmitting electrodes TE1 to TE10 may be arranged in the second direction DR2. Each of the transmitting electrodes TE1 to TE10 may include first sensing patterns SP1 and bridge patterns BP. At least one bridge pattern BP may be connected to two first sensing patterns SP1 disposed adjacent to each other. Each of the receiving electrodes RE1 to RE15 may extend in the second direction DR2. The receiving electrodes RE1 to RE15 may be arranged in the first direction DR1. Each of the receiving electrodes RE1 to RE15 may include second sensing patterns SP2 and extending patterns EP. At least one extending pattern EP may extend from two second sensing patterns SP2 disposed adjacent to each other.

The plurality of transmitting lines TxL1 to TxL10, the plurality of receiving lines RxL1 to RxL15, and the plurality of sensing pads PDT may be disposed in the peripheral area I_NAA. The transmitting lines TxL1 to TxL10 may be connected to the transmitting electrodes TE1 to TE10, respectively. In an embodiment of the present disclosure, the transmitting lines TxL1 to TxL10 may be connected to ends of the transmitting electrodes TE1 to TE10, respectively. The receiving lines RxL1 to RxL15 may be connected to the receiving electrodes RE1 to RE15, respectively. In an embodiment of the present disclosure, the receiving lines RxL1 to RxL15 may be connected to ends of the receiving electrodes RE1 to RE15, respectively. The input sensing panel ISP according to an embodiment of the present disclosure may have a single routing structure in which one transmitting line is connected to each of the transmitting electrodes TE1 to TE10 and one receiving line is connected to each of the receiving electrodes RE1 to RE15. However, embodiments of the present disclosure are not particularly limited thereto.

According to an embodiment of the present disclosure, some of the plurality of receiving lines RxL1 to RxL15 (hereinafter referred to as the first group LG1 (RxL1 to RXL8)) are connected to first ends of the corresponding receiving electrodes RE1 to RE8 among the receiving electrodes RE1 to RE15. The other receiving lines RxL9 to RxL15 (hereinafter referred to as the second group LG2) are connected to second ends of the corresponding receiving electrodes RE9 to RE15 among the receiving electrodes RE1 to RE15. Here, the second ends may be located on the opposite side to the first ends. In an embodiment of the present disclosure, the first ends may be right ends, and the second ends may be left ends.

As described above, among the plurality of receiving lines RxL1 to RxL15, the first group LG1 may be disposed in the peripheral area I_NAA located on a first side with respect to the active area I_AA, and the second group LG2 may be disposed in the peripheral area I_NAA located on a second side with respect to the active area I_AA. As the plurality of receiving lines RxL1 to RxL15 are divided into the two groups LG1 and LG2 and disposed in the peripheral areas I_NAA on the opposite sides, an asymmetrical increase in the width of the peripheral area on one side may be prevented or reduced.

The sensing pads PDT may be disposed in the peripheral area I_NAA. The sensing pads PDT may include first sensing pads TP1, second sensing pads TP2, and third sensing pads TP3. The first sensing pads TP1 may be connected to the transmitting lines TxL1 to TxL10 and may be electrically connected to the transmitting electrodes TE1 to TE10 accordingly. The second sensing pads TP2 may be connected to the first group of receiving lines RxL1 to RxL8, and the third sensing pads TP3 may be connected to the second group of receiving lines RxL9 to RxL15. Accordingly, the second sensing pads TP2 and the third sensing pads TP3 may be electrically connected to the receiving electrodes RE1 to RE15.

Referring to FIG. 5, the active area I_AA includes a first area AA1 (also referred to as the non-compensation area) where deviations of the mutual capacitances between the transmitting electrodes TE1 to TE10 and the receiving electrodes RE1 to RE15 are small and a second area AA2 where the deviations of the mutual capacitances are large. The second area AA2 includes first and third sub-areas S_AA1 and S_AA3 (also referred to as the non-5 compensation areas) where the mutual capacitances are relatively high and second and fourth sub-areas S_AA2 and S_AA4 (also referred to as the compensation areas) where the mutual capacitances are relatively low.

In an embodiment of the present disclosure, the second area AA2 may be defined in the area where the eighth receiving electrode RE8 and the ninth receiving electrode RE9 are disposed. The eighth receiving electrode RE8 is connected to the eighth receiving line RxL8 through the first end, and the ninth receiving electrode RE9 is connected to the ninth receiving line RxL9 through the second end. The first sub-area S_AA1 is defined as an area from the central portion of the eighth receiving electrode RE8 to the first end of the eighth receiving electrode RE8, and the second sub-area S_AA2 is defined as an area from the central portion of the eighth receiving electrode RE8 to the second end of the eighth receiving electrode RE8. The third sub-area S_AA3 is defined as an area from the central portion of the ninth receiving electrode RE9 to the second end of the ninth receiving electrode RE9, and the fourth sub-area S_AA4 is defined as an area from the central portion of the ninth receiving electrode RE9 to the first end of the ninth receiving electrode RE9. The first and fourth sub-areas S_AA1 and S_AA4 may be disposed adjacent to each other in the first direction DR1, and the second and third sub-areas S_AA2 and S_AA3 may be disposed adjacent to each other in the first direction DR1. The deviations of the mutual capacitances may be large between the first and fourth sub-areas S_AA1 and S_AA4, and the deviations of the mutual capacitances may be large between the second and third sub-areas S_AA2 and S_AA3.

Figure 6A:
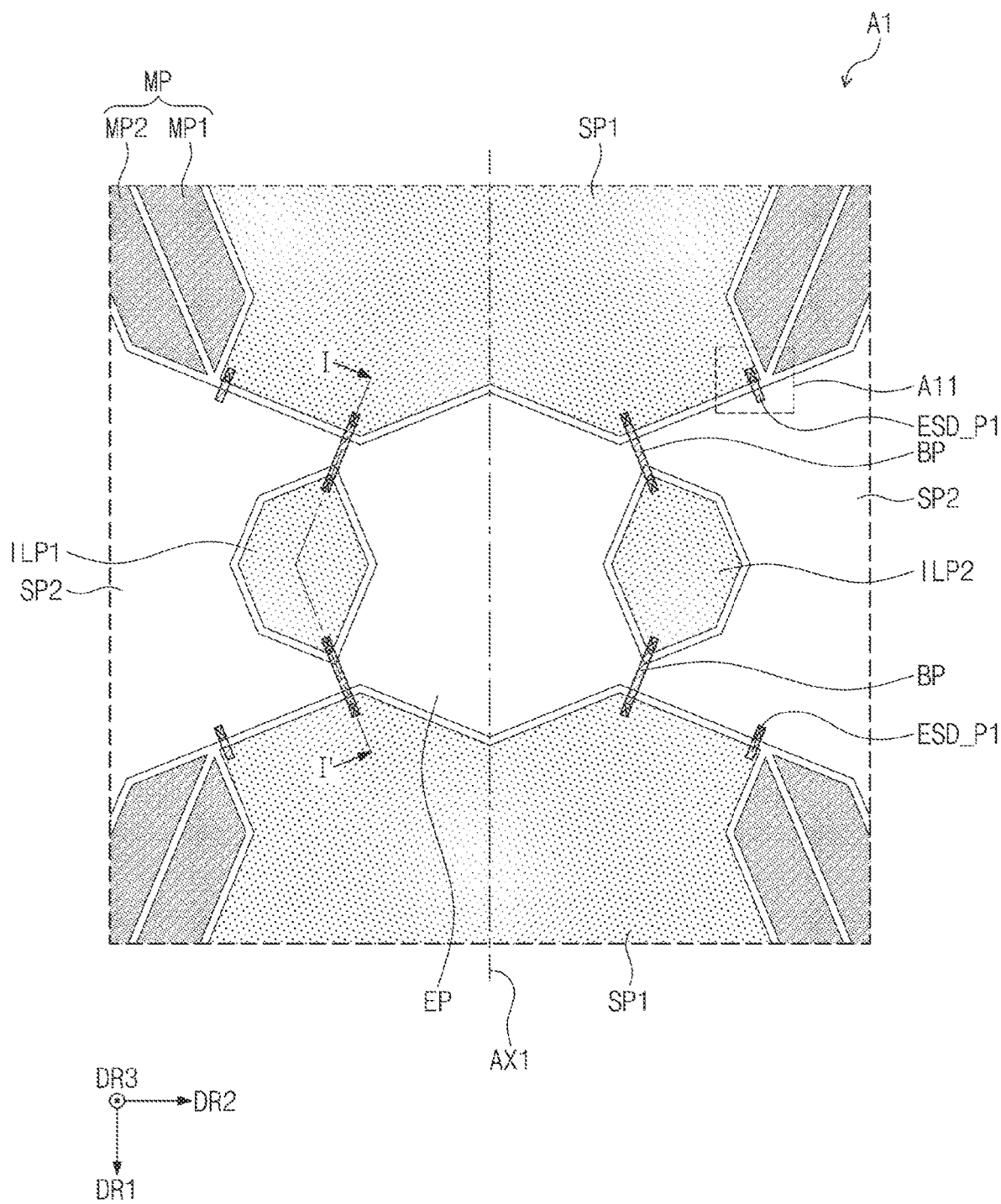
FIG. 6A is a plan view illustrating an area A1 of FIG. 5 according to an embodiment of the present disclosure.
Figure 6B:
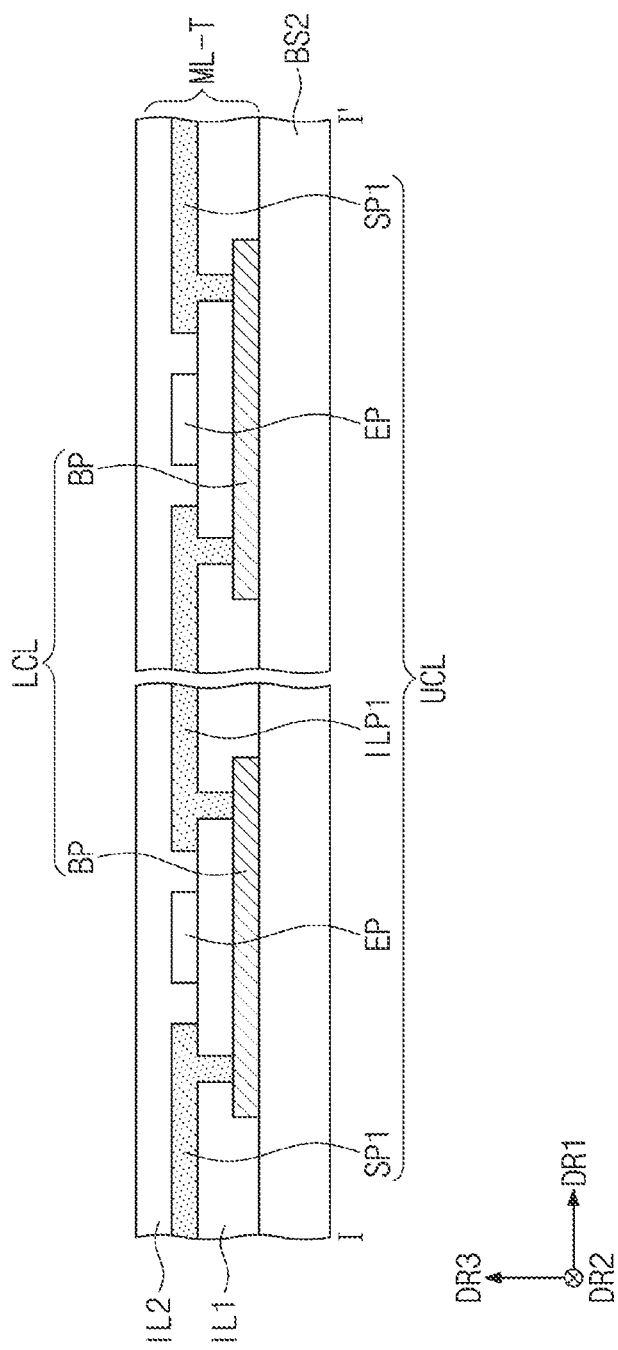
FIG. 6B is a cross-sectional view taken along line I-I' illustrated in FIG. 6A according to an embodiment of the present disclosure.
Figure 6C:
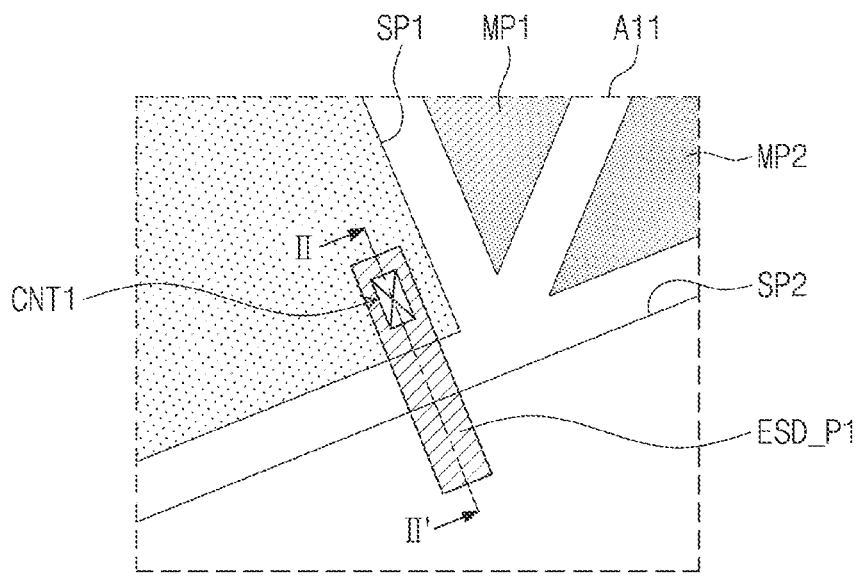
FIG. 6C is an enlarged plan view of an area A11 of FIG. 6A according to an embodiment of the present disclosure.
Figure 6D:
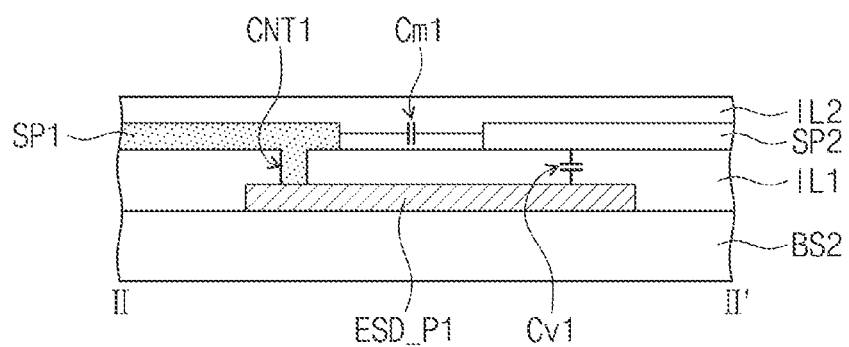
FIG. 6D is a cross-sectional view taken along line II-II' illustrated in FIG. 6C according to an embodiment of the present disclosure.

FIG. 6A is a plan view illustrating an area A1 of FIG. 5 according to an embodiment of the present disclosure. FIG. 6B is a cross-sectional view taken along line I-I' illustrated in FIG. 6A according to an embodiment of the present disclosure. FIG. 6C is an enlarged plan view of an area A11 of FIG. 6A according to an embodiment of the present disclosure. FIG. 6D is a cross-sectional view taken along line II-II' illustrated in FIG. 6C according to an embodiment of the present disclosure. The area A1 is located in the first area AA1 of FIG. 5. Hereinafter, the structure of the sensing circuit layer ML-T in the first area AA1 will be described in detail with reference to FIGS. 6A to 6D.

Referring to FIGS. 3A, 6A, and 6B, the sensing circuit layer ML-T may be disposed on the second base layer BS2. The sensing circuit layer ML-T may include a first conductive layer LCL, a first insulating layer IL1 disposed on the first conductive layer LCL, a second conductive layer UCL disposed on the first insulating layer IL1, and a second insulating layer IL2 disposed on the second conductive layer UCL.

The second conductive layer UCL may be a layer containing a transparent conductive material. The term "transparent" used herein may mean that light transmittance is greater than or equal to a predetermined reference value. For example, the predetermined reference value may be about 90%. However, embodiments of the present disclosure are not limited thereto. The second conductive layer UCL may contain transparent conductive oxide. For example, the second conductive layer UCL may contain at least one of indium tin oxide (ITO), indium zinc oxide (IZO), indium gallium oxide (IGO), indium gallium zinc oxide (IGZO), or a mixture/compound thereof. However, embodiments of the present disclosure are not limited thereto.

The second conductive layer UCL may include the first sensing patterns SP1, the second sensing patterns SP2, the extending patterns EP, and island patterns ILP1 and ILP2. The island patterns ILP1 and ILP2 may be electrically insulated from the second sensing patterns SP2 and the extending patterns EP and may be electrically connected to the first sensing patterns SP1.

The island patterns ILP1 and ILP2 may include a first island pattern ILP1 and a second island pattern ILP2. The first island pattern ILP1 may have a hexagonal shape. However, this is illustrative, and the first island pattern ILP1 according to an embodiment of the present disclosure may have various shapes. The second island pattern ILP2 may have a shape symmetrical to the shape of the first island pattern ILP1 with respect to a first axis AX1 extending in the first direction DR1. The second island pattern ILP2 may be spaced apart from the first island pattern ILP1 in the second direction DR2.

The second conductive layer UCL may further include dummy patterns MP. The dummy patterns MP may be formed through the same process as the first sensing patterns SP1 and the second sensing patterns SP2 and may contain the same material as the first sensing patterns SP1 and the second sensing patterns SP2. The dummy patterns MP, which are floating electrodes, are not electrically connected to the first sensing patterns SP1 and the second sensing patterns SP2. The dummy patterns MP may be disposed between the first sensing patterns SP1 and the second sensing patterns SP2. The dummy patterns MP may reduce the phenomenon in which the boundary areas between the first sensing patterns SP1 and the second sensing patterns SP2 are visually recognized. The dummy patterns MP may include a first dummy patterns MP1 and a second dummy patterns MP2.

The first dummy patterns MP1 may be disposed adjacent to the first sensing patterns SP1. The second dummy patterns MP2 may be disposed adjacent to the second sensing patterns SP2. The second dummy patterns MP2 and the first dummy patterns MP1 may be spaced apart from each other.

The first conductive layer LCL may be a layer containing an opaque conductive material. For example, the first conductive layer LCL may contain a metallic material. The first conductive layer LCL may contain, for example, molybdenum, silver, titanium, copper, aluminum, or an alloy thereof. The alloy may be, for example, molybdenum niobium (MoNb).

The first conductive layer LCL may include the bridge patterns BP. Although FIG. 6A illustrates an example in which four bridge patterns BP are disposed to connect two first sensing patterns SP1, the number of bridge patterns BP is not particularly limited thereto. Each of the bridge patterns BP may be connected to one of the first sensing patterns SP1 and one of the first and second island patterns ILP1 and ILP2. The two first sensing patterns SP1 spaced apart from each other may be electrically connected to each other through the bridge patterns BP and the first and second island patterns ILP1 and ILP2.

The first conductive layer LCL may further include first electrostatic induction patterns ESD_P1. The first electrostatic induction patterns ESD_P1 may be formed through the same process as the bridge patterns BP and may contain the same material as the bridge patterns BP. The first electrostatic induction patterns ESD_P1 may contain the same metallic material as the bridge patterns BP. The first electrostatic induction patterns ESD_P1 may contain a different material from the first sensing patterns SP1 and the second sensing patterns SP2.

In FIG. 6A, four first electrostatic induction patterns EDS_P1 are illustrated. Two first electrostatic induction patterns ESD_P1 (hereinafter referred to as a first upper electrostatic induction patterns) among the four first electrostatic induction patterns ESD_P1 may be electrically connected to the first sensing pattern SP1. One end of the first upper electrostatic induction pattern ESD_P1 may make direct contact with the first sensing pattern SP1, and an opposite end of the first upper electrostatic induction pattern ESD_P1 may overlap the second sensing pattern SP2. The remaining two first electrostatic induction patterns ESD_P1 (hereinafter referred to as a first lower electrostatic induction patterns) among the four first electrostatic induction patterns ESD_P1 may be electrically connected to the second sensing pattern SP2. One end of the first lower electrostatic induction pattern ESD_P1 may make direct contact with the second sensing pattern SP2, and an opposite end of the first lower electrostatic induction pattern ESD_P1 may overlap the first sensing pattern SP1.

The first electrostatic induction patterns ESD_P1 may be disposed adjacent to the bridge patterns BP. Accordingly, the first electrostatic induction patterns ESD_P1 may induce static electricity introduced from outside of the display device DD such that the static electricity is not provided toward the bridge patterns BP, thereby preventing disconnection of the bridge patterns BP due to the static electricity.

The first insulating layer IL1 may cover the first conductive layer LCL. The first insulating layer IL1 may contain an inorganic material. The inorganic material may include at least one of, for example, silicon oxide, silicon nitride, silicon oxy-nitride, titanium oxide, or aluminum oxide.

As illustrated in FIGS. 6C and 6D, the first electrostatic induction patterns ESD_P1 may be covered by the first insulating layer IL1. First contact holes CNT1 for electrically connecting the first electrostatic induction patterns ESD_P1 to the first or second sensing pattern SP1 or SP2 may be provided in the first insulating layer IL1. FIG. 6C illustrates a structure in which the first sensing pattern SP1 is directly connected to one end of the corresponding first electrostatic induction pattern ESD_P1 through one first contact hole CNT1 provided in the first insulating layer IL1. The first electrostatic induction pattern ESD_P1 may overlap the second sensing pattern SP2 disposed adjacent thereto.

A mutual capacitance Cm1 formed between the first and second sensing patterns SP1 and SP2 in the first area AA1 may be referred to as the first mutual capacitance. A vertical capacitance Cv1 may be formed between the first electrostatic induction pattern ESD_P1 and the second sensing pattern SP2. The vertical capacitance Cv1 formed between the first electrostatic induction pattern ESD_P1 and the second sensing pattern SP2 in the first area AA1 may be referred to as the first vertical capacitance. The first vertical capacitance Cv1 may be proportional to the overlapping area between the first electrostatic induction pattern ESD_P1 and the second sensing pattern SP2. That is, the first vertical capacitance Cv1 may be increased as the overlapping area between the first electrostatic induction pattern ESD_P1 and the second sensing pattern SP2 is increased.

As the first electrostatic induction pattern ESD_P1 is electrically connected to the first sensing pattern SP1, the first vertical capacitance Cv1 may compensate for the first mutual capacitance Cm1. A compensation level of the first mutual capacitance Cm1 may be increased with an increase in the first vertical capacitance Cv1. In an embodiment of the present disclosure, the first vertical capacitance Cv1 may have a constant value in the first area AA1. That is, the compensation level of the first mutual capacitance Cm1 by the first vertical capacitance Cv1 in the first area AA1 may be constant. Accordingly, in the first area AA1, the first vertical capacitance Cv1 cannot substantially compensate for a deviation of the first mutual capacitance Cm1.

The second insulating layer IL2 may cover the second conductive layer UCL. The second insulating layer IL2 may contain an inorganic material. For example, the second insulating layer IL2 may contain at least one of silicon oxide, silicon nitride, silicon oxy-nitride, titanium oxide, or aluminum oxide.

The input sensing panel ISP may further include a protective layer disposed on the second insulating layer IL2. The protective layer may contain an organic material. The protective area may serve to protect the first and second conductive layers LCL and UCL from moisture and foreign matter.

Figure 7A:
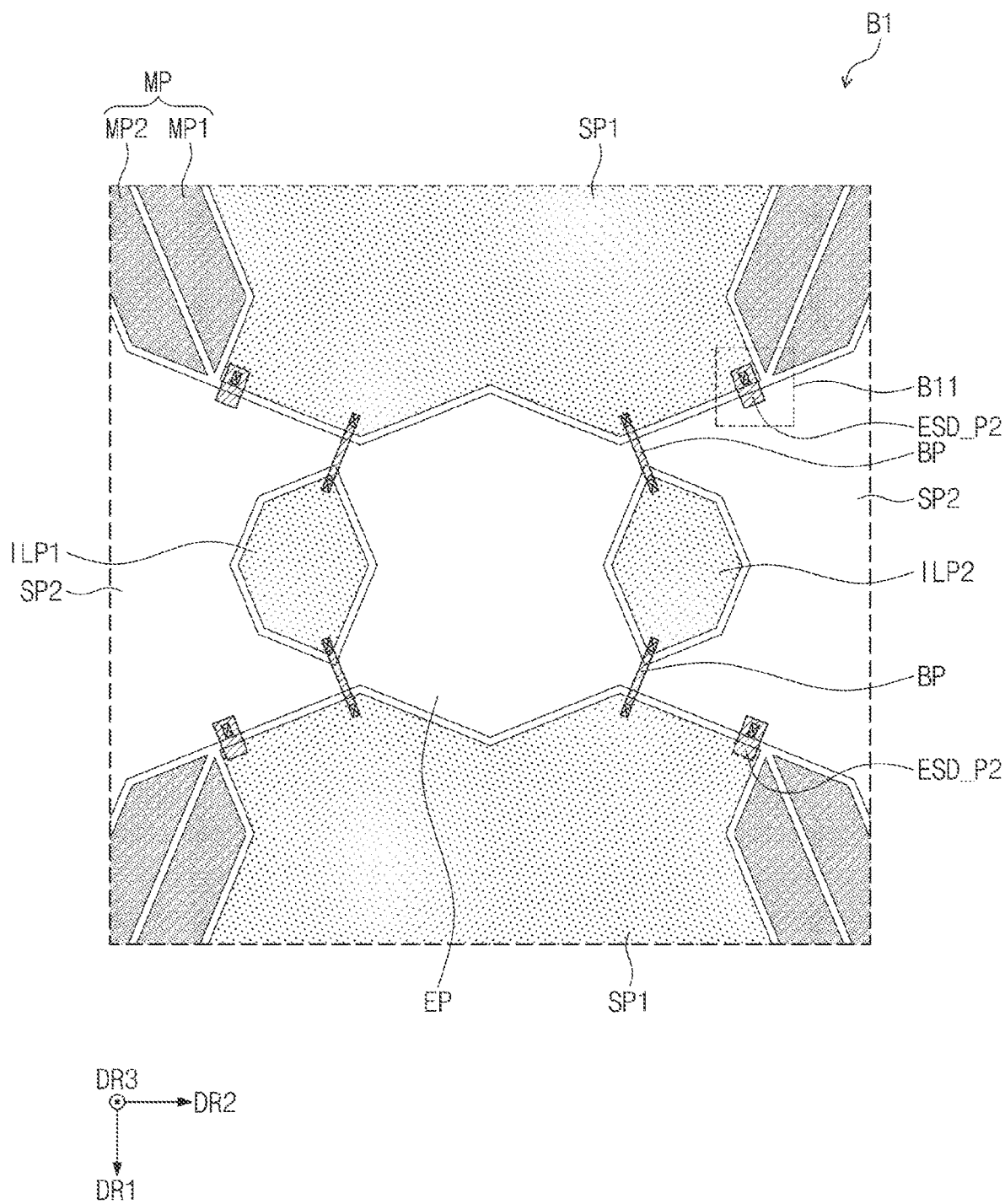
FIG. 7A is a plan view illustrating an area corresponding to an area B1 of FIG. 5 according to an embodiment of the present disclosure.
Figure 7B:
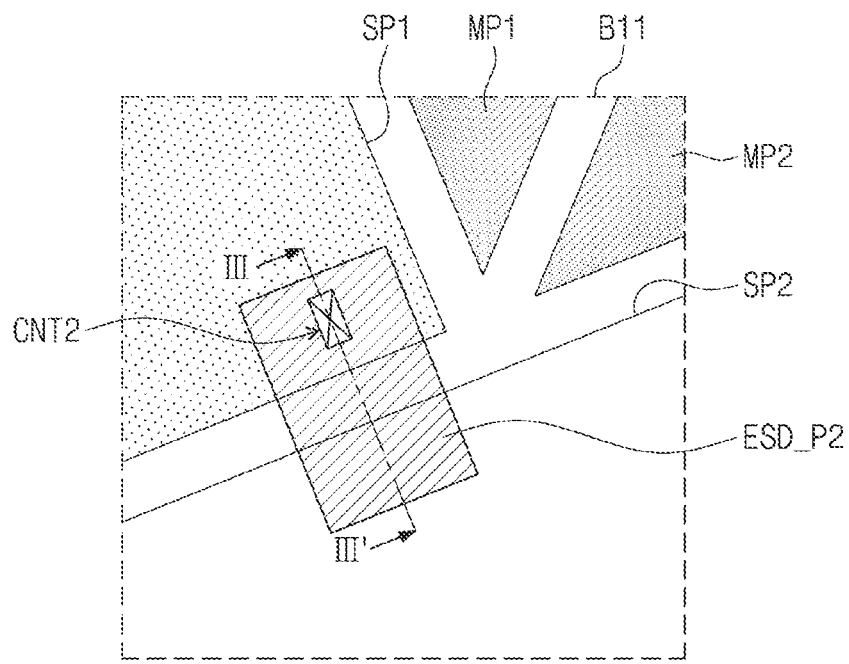
FIG. 7B is an enlarged plan view of an area B11 of FIG. 7A according to an embodiment of the present disclosure.
Figure 7C:
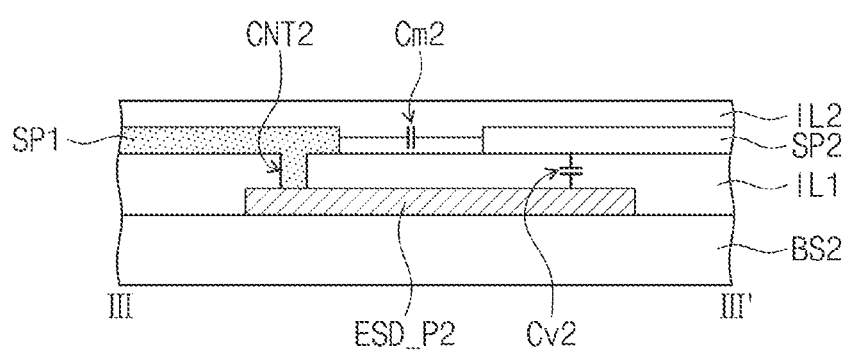
FIG. 7C is a cross-sectional view taken along line III-III' illustrated in FIG. 7B according to an embodiment of the present disclosure.

FIG. 7A is a plan view illustrating an area corresponding to an area B1 of FIG. 5 according to an embodiment of the present disclosure. FIG. 7B is an enlarged plan view of an area B11 of FIG. 7A according to an embodiment of the present disclosure. FIG. 7C is a cross-sectional view taken along line III-III' illustrated in FIG. 7B according to an embodiment of the present disclosure. The area B1 is located in the second area AA2 of FIG. 5. Hereinafter, the structure of the sensing circuit layer ML-T in the second area AA2 will be described in detail with reference to FIGS. 7A to 7C.

Among the components illustrated in FIGS. 7A to 7C, components identical to the components illustrated in FIGS. 6A to 6D will be assigned with identical reference numerals, and for convenience of explanation, a further description thereof will be omitted.

Referring to FIGS. 7A to 7C, the first conductive layer LCL (refer to FIG. 6B) may further include second electrostatic induction patterns ESD_P2. The second electrostatic induction patterns ESD_P2 may be formed through the same process as the bridge patterns BP and may contain the same material as the bridge patterns BP. The second electrostatic induction patterns ESD_P2 may contain the same metallic material as the bridge patterns BP. In an embodiment, the second electrostatic induction patterns ESD_P2 may contain a different material from the first sensing patterns SP1 and the second sensing patterns SP2. However, alternatively, in an embodiment, the second electrostatic induction patterns ESD_P2 may contain the same material (e.g., a transparent conductive material) as the first sensing patterns SP1 and the second sensing patterns SP2. When the second electrostatic induction patterns ESD_P2 contain a transparent conductive material, electrostatic induction characteristics may be decreased, but a phenomenon of visibility of the second electrostatic induction patterns ESD_P2 may be reduced or prevented.

At least one of the second electrostatic induction patterns ESD_P2 may have a different area from the first electrostatic induction patterns ESD_P1 (refer to FIG. 6A). In an embodiment of the present disclosure, at least one of the second electrostatic induction patterns ESD_P2 may have a larger area than the first electrostatic induction patterns ESD_P1 (refer to FIG. 6A).

In FIG. 7A, four second electrostatic induction patterns EDS_P2 are illustrated. Two second electrostatic induction patterns ESD_P2 (hereinafter referred to as second upper electrostatic induction patterns) among the four second electrostatic induction patterns ESD_P2 may be electrically connected to the first sensing pattern SP1. One end of the second upper electrostatic induction pattern ESD_P2 may be directly connected to the first sensing pattern SP1, and an opposite end of the second upper electrostatic induction pattern ESD_P2 may overlap the second sensing pattern SP2. The remaining two second electrostatic induction patterns ESD_P2 (hereinafter referred to as a second lower electrostatic induction patterns) among the four second electrostatic induction patterns ESD_P2 may be electrically connected to the second sensing pattern SP2. One end of the second lower electrostatic induction pattern ESD_P2 may make direct contact with the second sensing pattern SP2, and an opposite end of the second lower electrostatic induction pattern ESD_P2 may overlap the first sensing pattern SP1.

In the second area AA2, the second electrostatic induction patterns ESD_P2 may be disposed adjacent to the bridge patterns BP. Accordingly, the second electrostatic induction patterns ESD_P2 may induce static electricity introduced from outside of the display device DD such that the static electricity is not provided toward the bridge patterns BP, thereby preventing disconnection of the bridge patterns BP due to the static electricity.

As illustrated in FIGS. 7B and 7C, the second electrostatic induction patterns ESD_P2 may be covered by the first insulating layer IL1. Second contact holes CNT2 for electrically connecting the second electrostatic induction patterns ESD_P2 to the first or second sensing pattern SP1 or SP2 may be provided in the first insulating layer IL1. FIG. 7B illustrates a structure in which the first sensing pattern SP1 is electrically connected to one end of the corresponding second electrostatic induction pattern ESD_P2 through one second contact hole CNT2 provided in the first insulating layer IL1. The second electrostatic induction pattern ESD_P2 may overlap the second sensing pattern SP2 disposed adjacent thereto.

A mutual capacitance Cm2 formed between the first and second sensing patterns SP1 and SP2 in the second area AA2 may be referred to as a second mutual capacitance. A vertical capacitance Cv2 may be formed between the second electrostatic induction pattern ESD_P2 and the second sensing pattern SP2. The vertical capacitance Cv2 formed between the second electrostatic induction pattern ESD_P2 and the second sensing pattern SP2 in the second area AA2 may be referred to as a second vertical capacitance. The second vertical capacitance Cv2 may be proportional to the overlapping area between the second electrostatic induction pattern ESD_P2 and the second sensing pattern SP2. That is, the second vertical capacitance Cv2 may be increased as an overlapping area between the second electrostatic induction pattern ESD_P2 and the second sensing pattern SP2 is increased.

As the second electrostatic induction pattern ESD_P2 is electrically connected to the first sensing pattern SP1, the second vertical capacitance Cv2 may compensate for the second mutual capacitance Cm2. A compensation level of the second mutual capacitance Cm2 may be increased with an increase in the second vertical capacitance Cv2. In embodiments of the present disclosure, in the second area AA2, the second vertical capacitance Cv2 is not constant depending on positions. For example, in the second sub-area S_AA2 (refer to FIG. 5), the second vertical capacitance Cv2 may become gradually higher from the central portion toward the left end (e.g., the second end) than the first vertical capacitance Cv1, and in the fourth sub-area S_AA4 (refer to FIG. 5), the second vertical capacitance Cv2 may become gradually higher from the central portion toward the right end (e.g., the first end) than the first vertical capacitance Cv1.

In an embodiment of the present disclosure, the first electrostatic induction pattern ESD_P1 may be disposed in the first and third sub-areas S_AA1 and S_AA3 (refer to FIG. 5). Accordingly, in the first and third sub-areas S_AA1 and S_AA3, the second vertical capacitance Cv2 may remain the same as the first vertical capacitance Cv1.

As the second vertical capacitance Cv2 is gradually increased in the second and fourth sub-areas S_AA2 and S_AA4, the compensation level of the second mutual capacitance Cm2 by the second vertical capacitance Cv2 may be increased. In the second and fourth sub-areas S_AA2 and S_AA4, the relatively low second mutual capacitance Cm2 may be compensated for by the second vertical capacitance Cv2. Accordingly, between the first and fourth sub-areas S_AA1 and S_AA4, deviations of the second mutual capacitances Cm2 may be decreased by the second vertical capacitance Cv2, and between the second and third sub-areas S_AA2 and S_AA3, deviations of the second mutual capacitances Cm2 may be decreased by the second vertical capacitance Cv2. Thus, a malfunction due to the deviations of the second mutual capacitances Cm2 in the second area AA2 may be prevented or reduced.

Figure 8A:
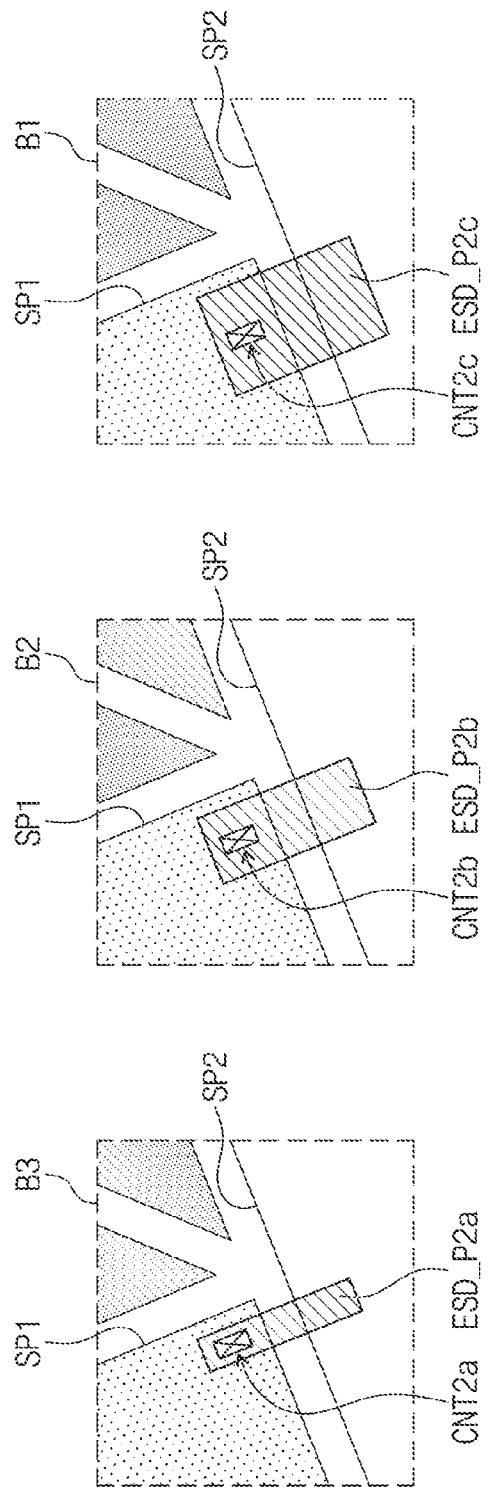
FIG. 8A is a plan view illustrating the shapes of second electrostatic induction patterns located in areas B3, B2, and B1 illustrated in FIG. 5 according to an embodiment of the present disclosure.
Figure 8B:
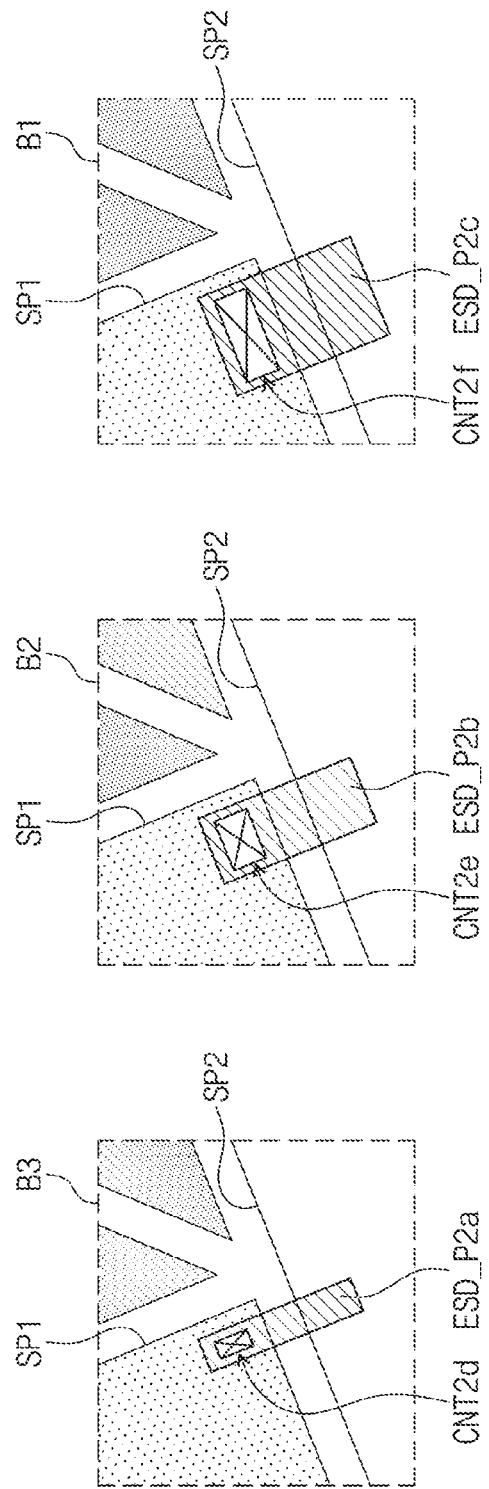
FIG. 8B is a plan view illustrating the shapes of second electrostatic induction patterns located in the areas B3, B2, and B1 illustrated in FIG. 5 according to an embodiment of the present disclosure.

FIG. 8A is a plan view illustrating the shapes of second electrostatic induction patterns located in areas B3, B2, and B1 illustrated in FIG. 5 according to an embodiment of the present disclosure. FIG. 8B is a plan view illustrating the shapes of second electrostatic induction patterns located in the areas B3, B2, and B1 illustrated in FIG. 5 according to an embodiment of the present disclosure.

Referring to FIGS. 5, 7B, and 8A, in the second sub-area S_AA2, the areas of the second electrostatic induction patterns ESD_P2 may be gradually increased from the central portion toward the left end (e.g., the second end). In the fourth sub-area S_AA4, the areas of the second electrostatic induction patterns ESD_P2 may be gradually increased from the central portion toward the right end (e.g., the first end).

In FIG. 8A, three second electrostatic induction patterns ESD_P2 located in the areas B3, B2, and B1 located in the fourth sub-area S_AA4 are illustrated. Hereinafter, for convenience of description, the second electrostatic induction patterns ESD_P2 located in the area B3 are referred to as a first size patterns ESD_P2a, the second electrostatic induction patterns ESD_P2 located in the area B2 are referred to as a second size patterns ESD_P2b, and the second electrostatic induction patterns ESD_P2 located in the area B1 are referred to as a third size patterns ESD_P2c. The first to third size patterns ESD_P2a, ESD_P2b, and ESD_P2c may be gradually increased from the central portion toward the right end (e.g., the first end).

The second mutual capacitance Cm2 (refer to FIG. 7C) in the area B3 is higher than the second mutual capacitance Cm2 in the area B2, and the second mutual capacitance Cm2 in the area B2 is higher than the second mutual capacitance Cm2 in the area B1. That is, in the fourth sub-area S_AA4, the second mutual capacitance Cm2 may be gradually decreased from the central portion toward the right end (e.g., the first end). To compensate for the second mutual capacitance Cm2 having this trend in the fourth sub-area S_AA4, the areas of the first to third size patterns ESD_P2a, ESD_P2b, and ESD_P2c may be gradually increased from the central portion toward the right end (e.g., the first end).

As illustrated in FIG. 8A, in an embodiment of the present disclosure, second contact holes CNT2a, CNT2b, and CNT2c corresponding to the first to third size patterns ESD_P2a, ESD_P2b, and ESC_P2c, respectively, may have the same size. However, embodiments of the present disclosure are not limited thereto. Alternatively, as illustrated in FIG. 8B, second contact holes CNT2d, CNT2e, and CNT2f corresponding to the first to third size patterns ESD_P2a, ESD_P2b, and ESC_P2c, respectively, may have different sizes. The sizes of the second contact holes CNT2d, CNT2e, and CNT2f may be gradually increased from the central portion toward the right end (e.g., the first end).

As the sizes of the second contact holes CNT2d, CNT2e, and CNT2f are increased, contact resistance may be decreased, and a compensation level of the second mutual capacitance Cm2 may be further increased accordingly.

Figure 9A:
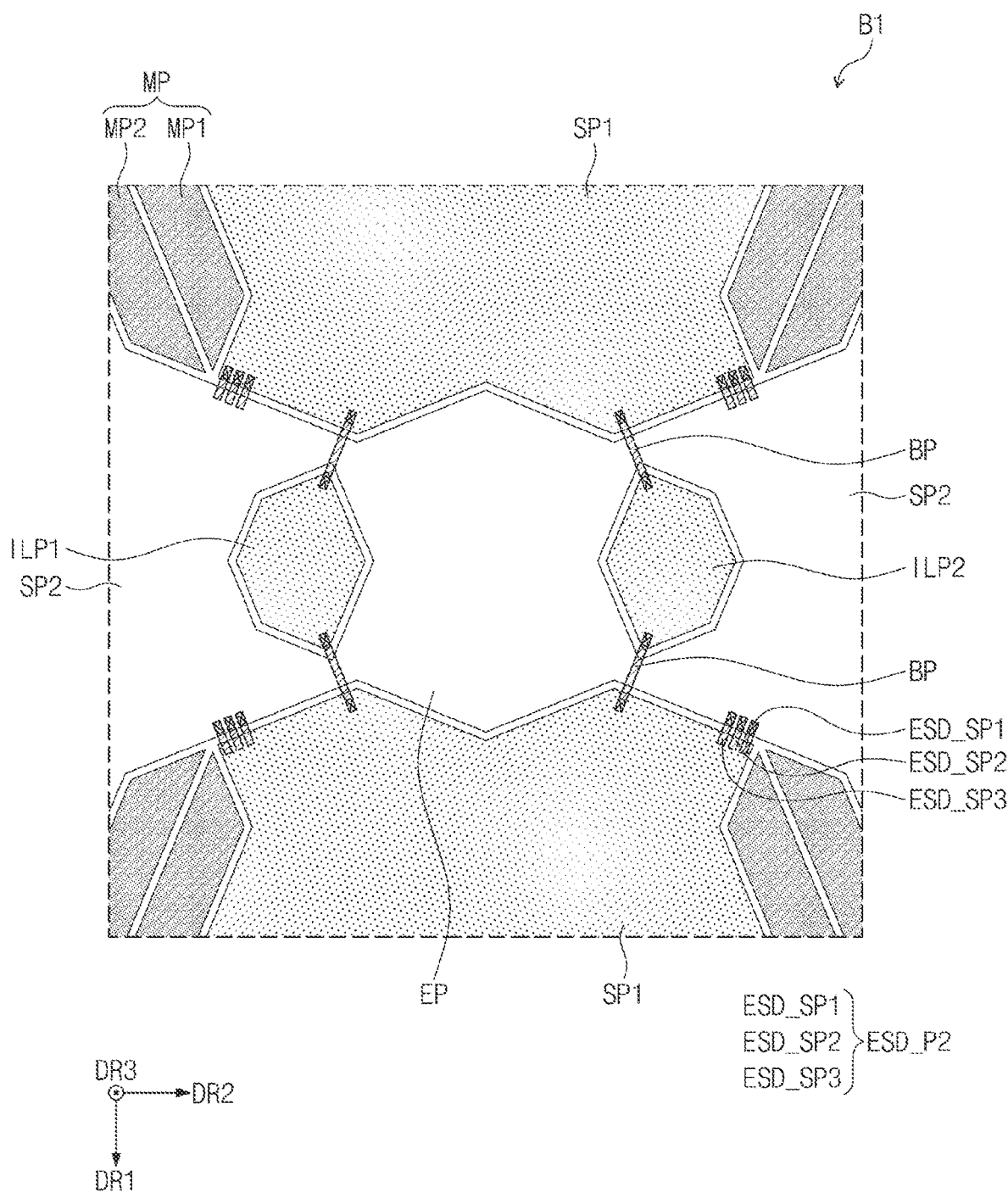
FIG. 9A is a plan view illustrating an area corresponding to the area B1 of FIG. 5 according to an embodiment of the present disclosure.
Figure 9B:
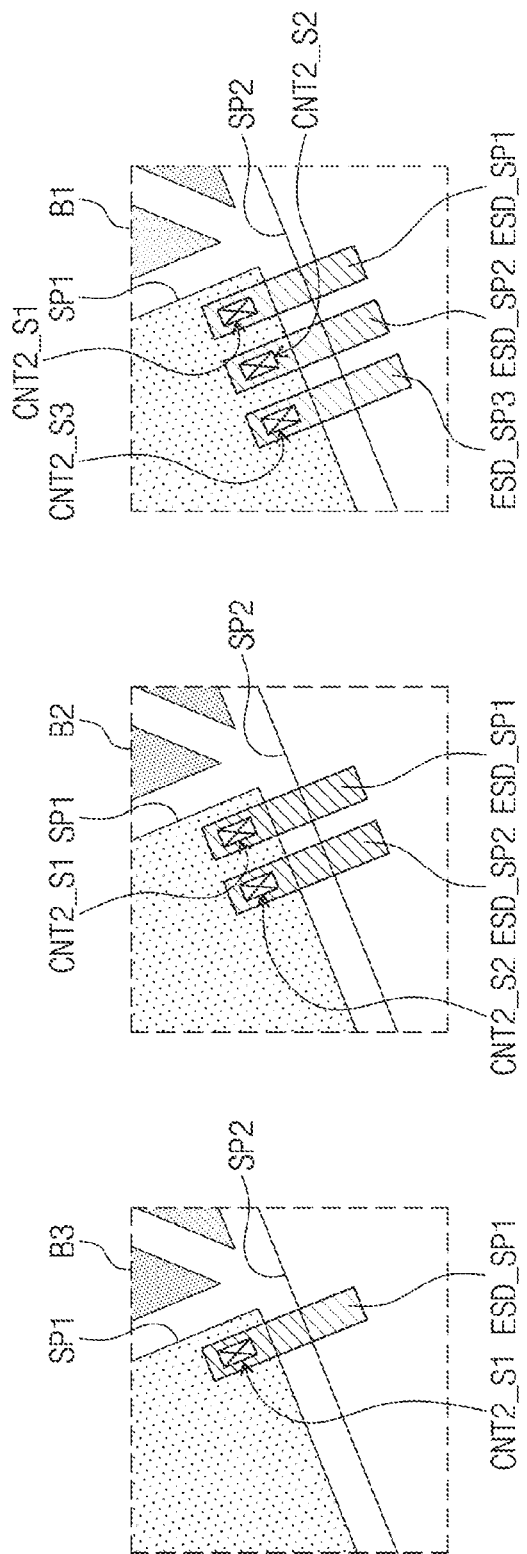
FIG. 9B is a plan view illustrating the shapes of second electrostatic induction patterns located in the areas B3, B2, and B1 illustrated in FIG. 5 according to an embodiment of the present disclosure.

FIG. 9A is a plan view illustrating an area corresponding to the area B1 of FIG. 5 according to an embodiment of the present disclosure. FIG. 9B is a plan view illustrating the shapes of second electrostatic induction patterns located in the areas B3, B2, and B1 illustrated in FIG. 5 according to an embodiment of the present disclosure. The areas B1 to B3 are located in the second area AA2 of FIG. 5. Hereinafter, the structure of the sensing circuit layer ML-T in the second area AA2 will be described in detail with reference to FIGS. 9A and 9B.

Among the components illustrated in FIGS. 9A and 9B, components identical to the components illustrated in FIGS. 7A to 7C will be assigned with identical reference numerals, and for convenience of explanation, a further description thereof will be omitted.

Referring to FIGS. 9A and 9B, the first conductive layer LCL (refer to FIG. 6B) may further include the second electrostatic induction patterns ESD_P2. Each of the second electrostatic induction patterns ESD_P2 may include a plurality of sub-electrostatic induction patterns ESD_SP1, ESD_SP2, and ESD_SP3. The plurality of sub-electrostatic induction patterns ESD_SP1, ESD_SP2, and ESD_SP3 may have the same size as the first electrostatic induction patterns ESD_P1 illustrated in FIG. 6A. The plurality of sub-electrostatic induction patterns ESD_SP1, ESD_SP2, and ESD_SP3 may be spaced apart from one another. The plurality of sub-electrostatic induction patterns ESD_SP1, ESD_SP2, and ESD_SP3 may have the same size. However, this is illustrative, and according to embodiments, the plurality of sub-electrostatic induction patterns ESD_SP1, ESD_SP2, and ESD_SP3 may have different sizes.

The number of sub-electrostatic induction patterns ESD_SP1, ESD_SP2, and ESD_SP3 included in each of the second electrostatic induction patterns ESD_P2 may vary depending on positions. In the second sub-area S_AA2 (refer to FIG. 5), the number of sub-electrostatic induction patterns ESD_SP1, ESD_SP2, and ESD_SP3 may be gradually increased from the central portion toward the left end (e.g., the second end). In the fourth sub-area S_AA4 (refer to FIG. 5), the number of sub-electrostatic induction patterns ESD_SP1, ESD_SP2, and ESD_SP3 may be gradually increased from the central portion toward the right end (e.g., the first end).

In FIG. 9B, three second electrostatic induction patterns ESD_P2 located in the areas B3, B2, and B1 located in the fourth sub-area S_AA4 are illustrated. The second electrostatic induction patterns ESD_P2 located in the area B3 include the first sub-electrostatic induction pattern ESD_SP1, and the second electrostatic induction patterns ESD_P2 located in the area B2 include the first and second sub-electrostatic induction patterns ESD_SP1 and ESD_SP2. The second electrostatic induction patterns ESD_P2 located in the area B1 include the first, second, and third sub-electrostatic induction patterns ESD_SP1, ESD_SP2, and ESD_SP3.

The second mutual capacitance Cm2 (refer to FIG. 7C) in the area B3 is higher than the second mutual capacitance Cm2 in the area B2, and the second mutual capacitance Cm2 in the area B2 is higher than the second mutual capacitance Cm2 in the area B1.

When the first sub-electrostatic induction pattern ESD_SP1 has the same area as the first electrostatic induction patterns ESD_P1 (refer to FIG. 6C), the second vertical capacitance Cv2 (refer to FIG. 7C) in the area B3 may be about equal to the first vertical capacitance Cv1 (refer to FIG. 6D). When the first and second sub-electrostatic induction patterns ESD_SP1 and ESD_SP2 have the same area as the first electrostatic induction patterns ESD_P1, the second vertical capacitance Cv2 in the area B2 may be about equal to twice the first vertical capacitance Cv1. When the first, second, and third sub-electrostatic induction patterns ESD_SP1, ESD_SP2, and ESD_SP3 have the same area as the first electrostatic induction patterns ESD_P1, the second vertical capacitance Cv2 in the area B1 may be about equal to three times the first vertical capacitance Cv1. The second vertical capacitance Cv2 may be increased as the number of sub-electrostatic induction patterns in the fourth sub-area S_AA4 is gradually increased from the central portion toward the right end (e.g., the first end).

Accordingly, even though the second mutual capacitance Cm2 is gradually decreased from the central portion to the right end (e.g., the first end) in the fourth sub-area S_AA4, a compensation level of the second mutual capacitance Cm2 may be increased by the gradually increased second vertical capacitance Cv2. Thus, a deviation of the second mutual capacitance Cm2 may be decreased between the fourth sub-area S_AA4 and the first sub-area S_AA1 (refer to FIG. 5).

Figure 10A:
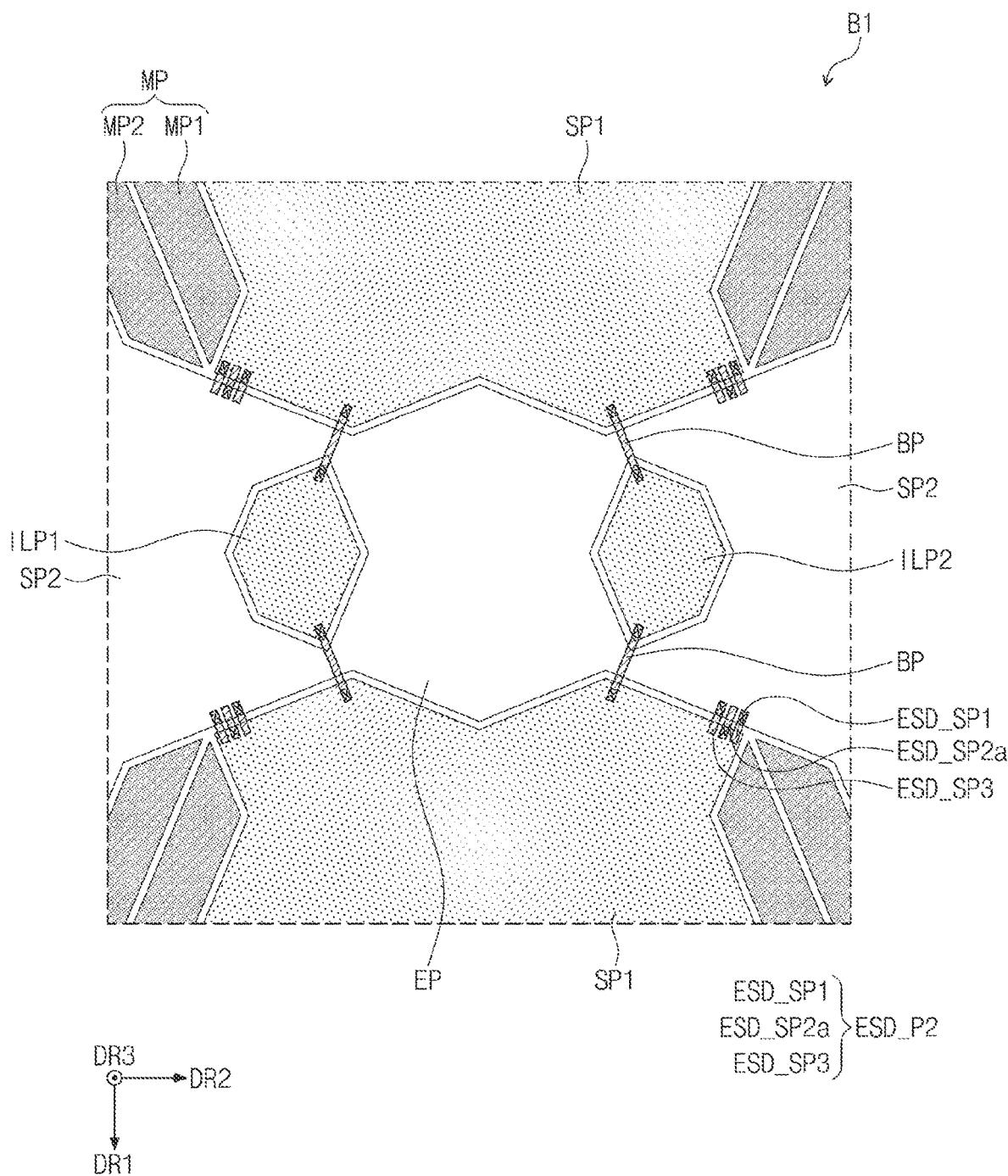
FIG. 10A is a plan view illustrating an area corresponding to the area B1 of FIG. 5 according to an embodiment of the present disclosure.
Figure 10B:
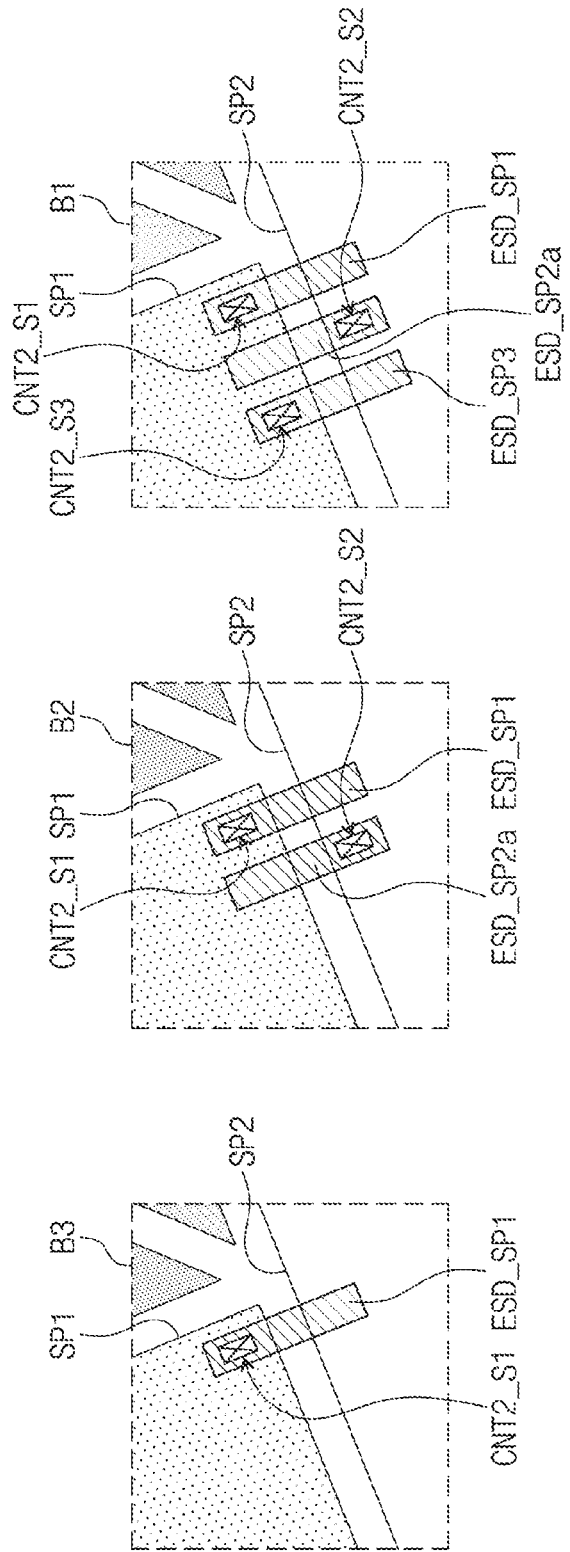
FIG. 10B is a plan view illustrating the shapes of second electrostatic induction patterns located in areas B3, B2, and B1 illustrated in FIG. 5 according to an embodiment of the present disclosure.

FIG. 10A is a plan view illustrating an area corresponding to the area B1 of FIG. 5 according to an embodiment of the present disclosure. FIG. 10B is a plan view illustrating the shapes of second electrostatic induction patterns located in the areas B3, B2, and B1 illustrated in FIG. 5 according to an embodiment of the present disclosure.

Referring to FIGS. 10A and 10B, each of the second electrostatic induction patterns ESD_P2 may include a plurality of sub-electrostatic induction patterns ESD_SP1, ESD_SP2a, and ESD_SP3. The plurality of sub-electrostatic induction patterns ESD_SP1, ESD_SP2a, and ESD_SP3 may have about the same size as the first electrostatic induction patterns ESD_P1 illustrated in FIG. 6A. The plurality of sub-electrostatic induction patterns ESD_SP1, ESD_SP2a, and ESD_SP3 may be spaced apart from one another. The plurality of sub-electrostatic induction patterns ESD_SP1, ESD_SP2a, and ESD_SP3 may have about the same size. However, this is illustrative, and according to embodiments, the plurality of sub-electrostatic induction patterns ESD_SP1, ESD_SP2a, and ESD_SP3 may have different sizes.

The number of sub-electrostatic induction patterns ESD_SP1, ESD_SP2a, and ESD_SP3 included in each of the second electrostatic induction patterns ESD_P2 may vary depending on positions. In the second sub-area S_AA2 (refer to FIG. 5), the number of sub-electrostatic induction patterns ESD_SP1, ESD_SP2a, and ESD_SP3 may be gradually increased from the central portion toward the left end (e.g., the second end). In the fourth sub-area S_AA4 (refer to FIG. 5), the number of sub-electrostatic induction patterns ESD_SP1, ESD_SP2a, and ESD_SP3 may be gradually increased from the central portion toward the right end (e.g., the first end).

In FIG. 10B, three second electrostatic induction patterns ESD_P2 located in the areas B3, B2, and B1 located in the fourth sub-area S_AA4 are illustrated. The second electrostatic induction patterns ESD_P2 located in the area B3 include the first sub-electrostatic induction pattern ESD_SP1, and the second electrostatic induction patterns ESD_P2 located in the area B2 include the first and second sub-electrostatic induction patterns ESD_SP1 and ESD_SP2a. The second electrostatic induction patterns ESD_P2 located in the area B1 may include the first, second, and third sub-electrostatic induction patterns ESD_SP1, ESD_SP2a, and ESD_SP3.

In FIG. 10B, the second sub-electrostatic induction pattern ESD_SP2a may be connected to a sensing pattern different from the sensing pattern to which the first and third sub-electrostatic induction patterns ESD_SP1 and ESD_SP3 are connected. For example, when the first and third sub-electrostatic induction patterns ESD_SP1 and ESD_SP3 are electrically connected to the first sensing pattern SP1, the second sub-electrostatic induction pattern ESD_SP2a may be electrically connected to the second sensing pattern SP2. The first and third sub-electrostatic induction patterns ESD_SP1 and ESD_SP3 and the second sub-electrostatic induction pattern ESD_SP2a may be alternately disposed.

The positions where the first and third sub-electrostatic induction patterns ESD_SP1 and ESD_SP3 are connected to the first sensing pattern SP1 may be referred to as the first and third sub-contact holes CNT2_S1 and CNT2_S3, and the position where the second sub-electrostatic induction pattern ESD_SP2a is connected to the second sensing pattern SP2 may be referred to as the second sub-contact hole CNT2_S2.

As the first, second, and third sub-contact holes CNT2_S1, CNT2_S2, and CNT2_S3 are disposed in zig-zags, a phenomenon of deterioration in display quality by the first, second, and third sub-electrostatic induction patterns ESD_SP1, ESD_SP2a, and ESD_SP3 may be prevented or reduced.

Figure 11A:
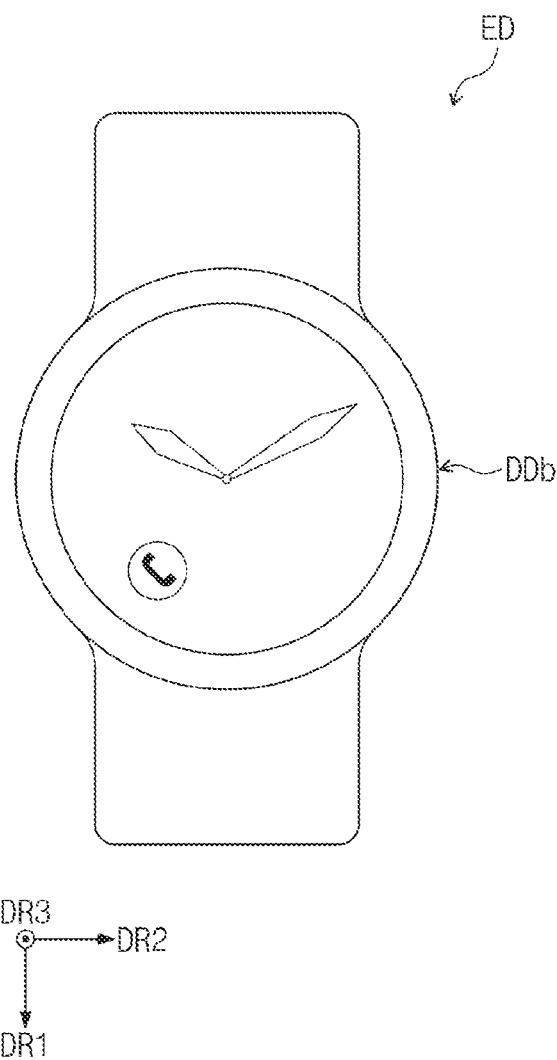
FIG. 11A is a plan view of an electronic device according to an embodiment of the present disclosure.
Figure 11B:
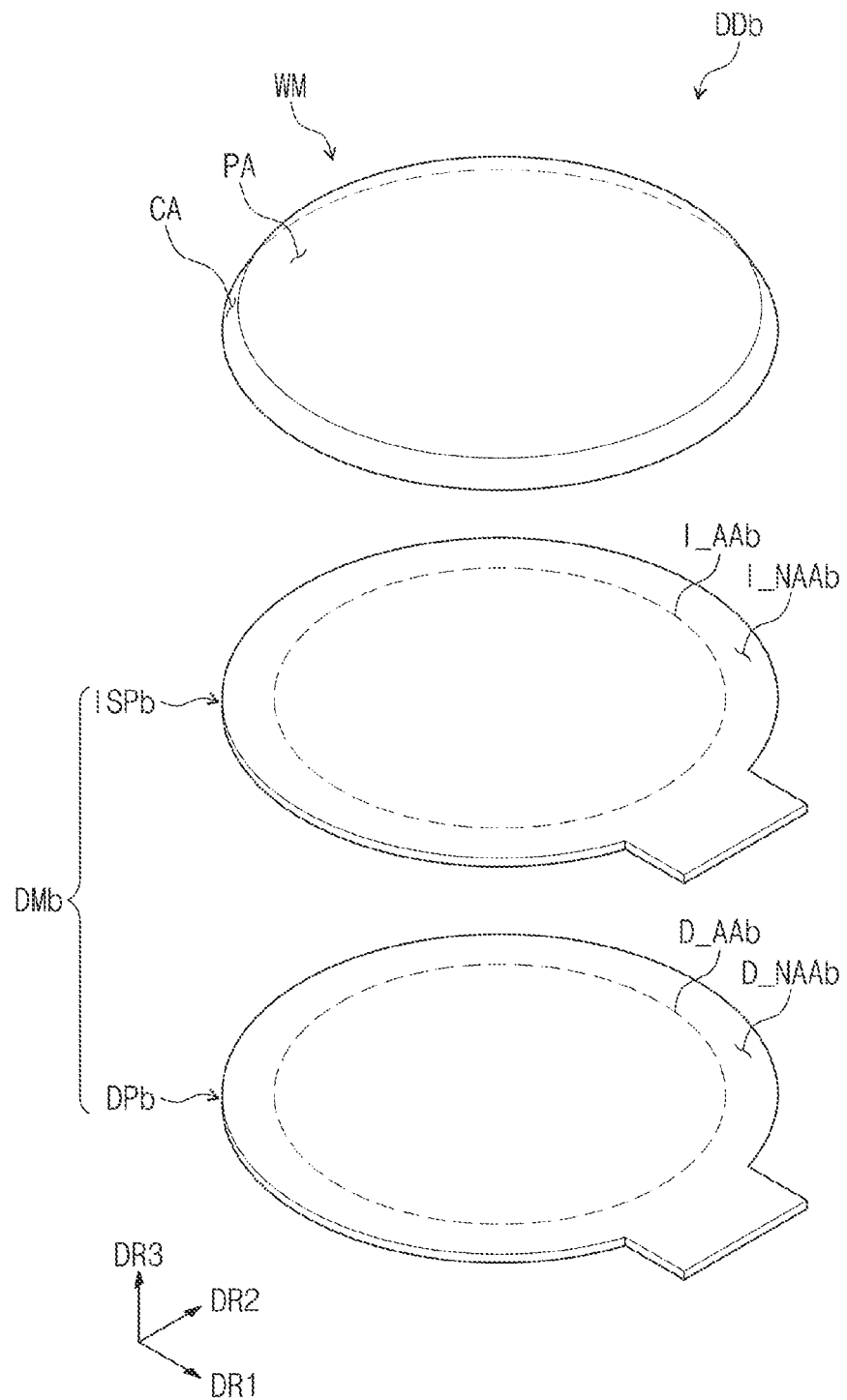
FIG. 11B is an exploded perspective view of a display device illustrated in FIG. 11A according to an embodiment of the present disclosure.
Figure 11C:
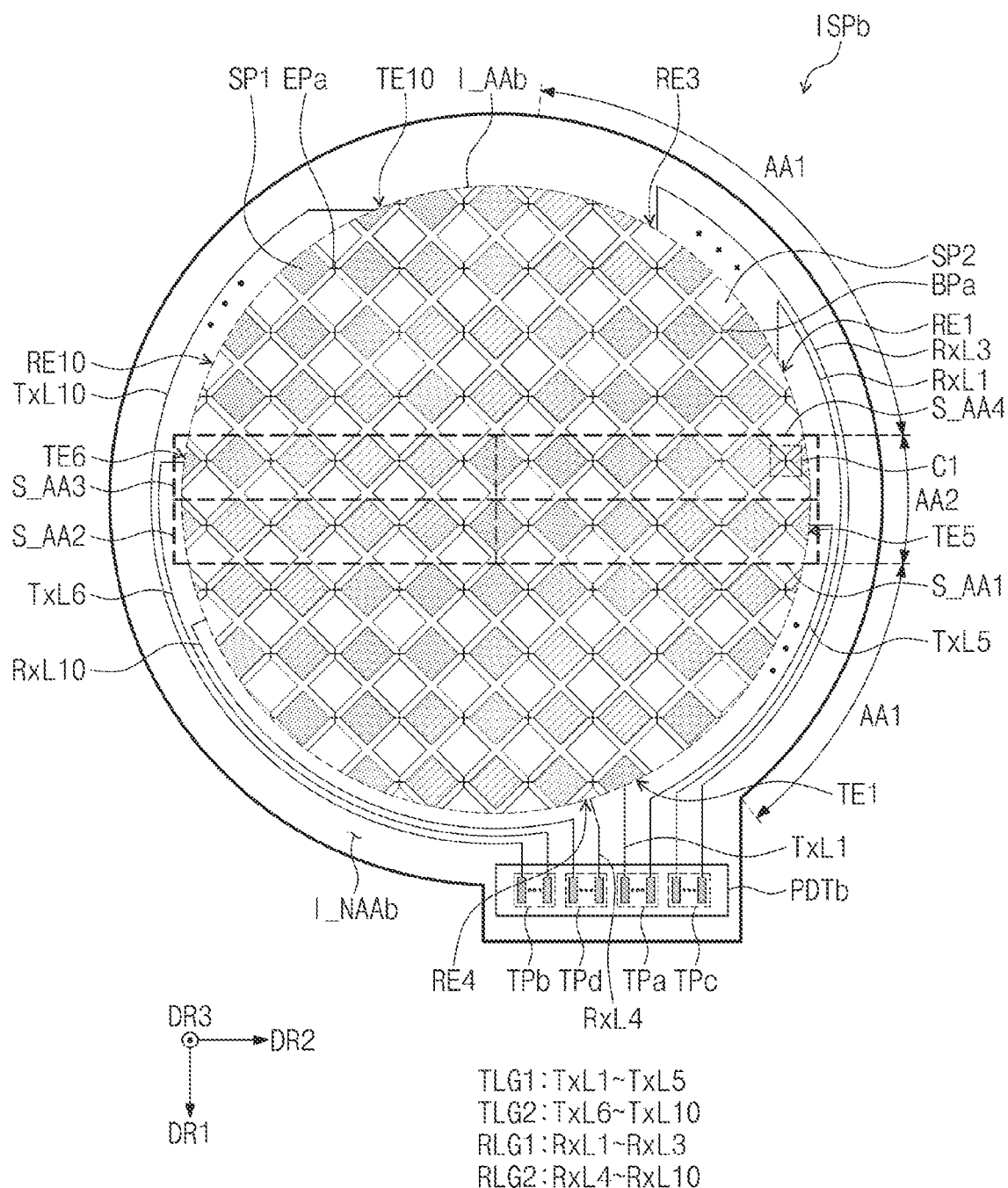
FIG. 11C is a plan view of an input sensing panel illustrated in FIG. 11B according to an embodiment of the present disclosure.
Figure 11D:
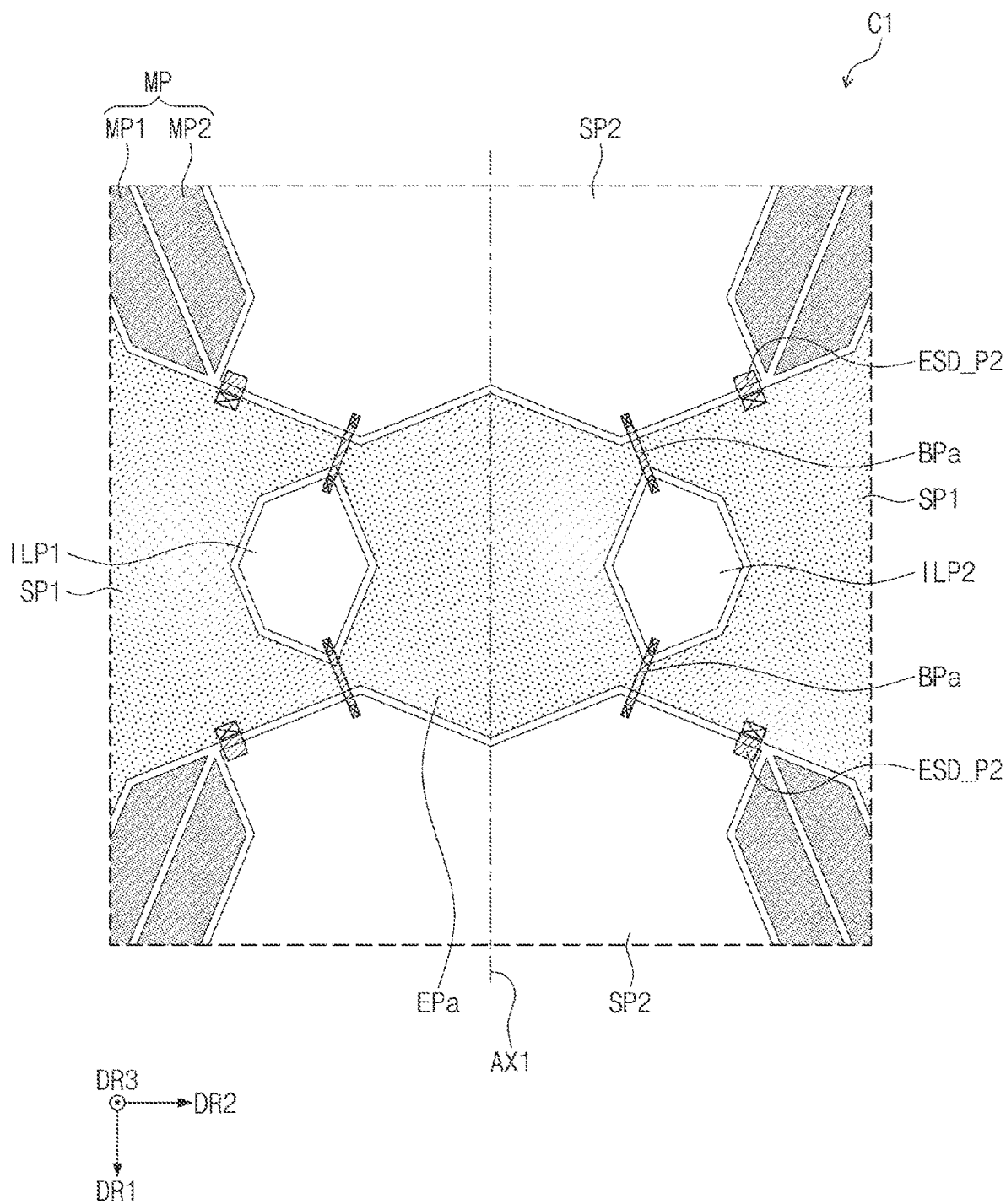
FIG. 11D is an enlarged view of an area C1 of FIG. 11C according to an embodiment of the present disclosure.

FIG. 11A is a plan view of an electronic device according to an embodiment of the present disclosure. FIG. 11B is an exploded perspective view of a display device illustrated in FIG. 11A according to an embodiment of the present disclosure. FIG. 11C is a plan view of an input sensing panel illustrated in FIG. 11B according to an embodiment of the present disclosure. FIG. 11D is an enlarged view of an area C1 of FIG. 11C according to an embodiment of the present disclosure.

Referring to FIG. 11A, the electronic device ED according to an embodiment of the present disclosure may be a wearable device. The electronic device ED may include a display device DDb having a circular shape. However, the shape of the display device DDb is not limited thereto. For example, the display device DDb may have a square shape with rounded corners.

As illustrated in FIG. 11B, the display device DDb may include a display module DMb and a window WM. The display module DMb may include a display panel DPb and an input sensing panel ISPb.

According to an embodiment, the window WM may include a planar portion PA having a circular shape and a curved portion CA that extends from the planar portion PA and that is bent in a predetermined direction. The curved portion CA may surround the planar portion PA. That is, unlike the window WP having a flat shape, which is illustrated in FIG. 2, the window WM illustrated in FIG. 11B may include the bent portion. Accordingly, the window WM according to an embodiment of FIG. 11B may have a three-dimensional shape. According to an embodiment, the curved portion CA may include at least part of the bezel area BZA (refer to FIG. 2). For example, only a portion disposed adjacent to an end of the curved portion CA that is spaced apart from the planar portion PA may form the bezel area BZA, or the entire curved portion CA may form the bezel area BZA.

The display panel DPb includes an active area D_AAb and a peripheral area D_NAAb. The active area D_AAb may be an area where an image is displayed, and the peripheral area D_NAAb may be an area where the image is not displayed. The active area D_AAb may have a circular shape. A plurality of pixels PX may be disposed in the active area D_AAb. The peripheral area D_NAAb may be an area where a drive circuit or a drive line is disposed, and therefore, an image is not displayed. The active area D_AAb may overlap the planar portion PA of the window WM, and the peripheral area D_NAAb may overlap the curved portion CA of the window WM.

Referring to FIGS. 11B and 11C, the input sensing panel ISPb may include an active area I_AAb and a peripheral area I_NAAb disposed adjacent to the active area I_AAb. The peripheral area I_NAAb may surround the active area I_AAb. The active area I_AAb may correspond to the active area D_AAb of the display panel DPb, and the peripheral area I_NAAb may correspond to the peripheral area D_NAAb of the display panel DPb.

The input sensing panel ISPb may include a plurality of transmitting electrodes TE1 to TE10 (also referred to as the first sensing electrodes), a plurality of receiving electrodes RE1 to RE10 (also referred to as the second sensing electrodes), a plurality of transmitting lines TxL1 to TxL10 (also referred to as the first signal lines), a plurality of receiving lines RxL1 to RxL10 (also referred to as the second signal lines), and a plurality of sensing pads PDTb.

The plurality of transmitting electrodes TE1 to TE10 and the plurality of receiving electrodes RE1 to RE10 may be disposed in the active area I_AAb. The input sensing panel ISPb may obtain information about an external input through a change in capacitances between the transmitting electrodes TE1 to TE10 and the receiving electrodes RE1 to RE10 (hereinafter referred to as the mutual capacitances). Although the ten transmitting electrodes TE1 to TE10 and the ten receiving electrodes RE1 to RE10 are illustrated in FIG. 11C, the number of transmitting electrodes and the number of receiving electrodes are not limited thereto.

Each of the transmitting electrodes TE1 to TE10 may extend in the second direction DR2. The transmitting electrodes TE1 to TE10 may be arranged in the first direction DR1. Each of the transmitting electrodes TE1 to TE10 may include first sensing patterns SP1 and extending patterns EPa. At least one extending pattern EPa may extend from two first sensing patterns SP1 disposed adjacent to each other. Each of the receiving electrodes RE1 to RE10 may extend in the first direction DR1. The receiving electrodes RE1 to RE10 may be arranged in the second direction DR2. Each of the receiving electrodes RE1 to RE10 may include second sensing patterns SP2 and bridge patterns BPa. At least one bridge pattern BPa may be connected to two second sensing patterns SP2 disposed adjacent to each other.

The plurality of transmitting lines TxL1 to TxL10, the plurality of receiving lines RxL1 to RxL10, and the plurality of sensing pads PDTb may be disposed in the peripheral area I_NAAb. The transmitting lines TxL1 to TxL10 may be connected to the transmitting electrodes TE1 to TE10, respectively. In an embodiment of the present disclosure, the transmitting lines TxL1 to TxL10 may be connected to ends of the transmitting electrodes TE1 to TE10, respectively. The receiving lines RxL1 to RxL10 may be connected to the receiving electrodes RE1 to RE10, respectively. In an embodiment of the present disclosure, the receiving lines RxL1 to RxL10 may be connected to ends of the receiving electrodes RE1 to RE10, respectively. The input sensing panel ISPb according to an embodiment of the present disclosure may have a single routing structure in which one transmitting line is connected to each of the transmitting electrodes TE1 to TE10 and one receiving line is connected to each of the receiving electrodes RE1 to RE10. However, embodiments of the present disclosure are not particularly limited thereto.

According to an embodiment of the present disclosure, some of the plurality of transmitting lines TxL1 to TxL10 (hereinafter referred to as a first group TLG1 (TxL1 to TxL5)) are connected to first ends of the corresponding transmitting electrodes TE1 to TE5 among the transmitting electrodes TE1 to TE10. The other transmitting lines TxL6 to TxL10 (hereinafter referred to as a second group TLG2) are connected to second ends of the corresponding transmitting electrodes TE6 to TE10 among the transmitting electrodes TE1 to TE10. Here, the second ends may be located on the opposite side to the first ends. In an embodiment of the present disclosure, the first ends may be right ends, and the second ends may be left ends.

According to an embodiment of the present disclosure, some of the plurality of receiving lines RxL1 to RxL10 (hereinafter referred to as a first group RLG1 (RxL1 to RxL3)) are connected to first ends of the corresponding receiving electrodes RE1 to RE3 among the receiving electrodes RE1 to RE10. The other receiving lines RxL4 to RxL10 (hereinafter referred to as a second group RLG2) are connected to second ends of the corresponding receiving electrodes RE4 to RE10 among the receiving electrodes RE1 to RE10. Here, the second ends may be located on the opposite side to the first ends. In an embodiment of the present disclosure, the first ends may be upper ends, and the second ends may be lower ends.

As described above, among the plurality of transmitting lines TxL1 to TxL10, the first group TLG1 is disposed in the peripheral area I_NAAb located on the right side with respect to the active area I_AAb, and the second group TLG2 is disposed in the peripheral area I_NAAb located on the left side with respect to the active area I_AAb. Among the plurality of receiving lines RxL1 to RxL10, the first group RLG1 is disposed in the peripheral area I_NAAb located on the upper side with respect to the active area I_AAb, and the second group RLG2 is disposed in the peripheral area I_NAAb located on the lower side with respect to the active area I_AAb.

As the plurality of transmitting lines TxL1 to TxL10 are divided into the two groups TLG1 and TLG2 and disposed in the right and left peripheral areas I_NAAb and the plurality of receiving lines RxL1 to RxL10 are divided into the two groups RLG1 and RLG2 and disposed in the upper and lower peripheral areas I_NAAb, an asymmetrical increase in the width of the peripheral area on one side may be prevented or reduced.

The sensing pads PDTb may be disposed in the peripheral area I_NAAb. The sensing pads PDTb may include first sensing pads TPa, second sensing pads TPb, third sensing pads TPc, and fourth sensing pads TPd. The first sensing pads TPa may be connected to the transmitting lines TxL1 to TxL5 belonging to the first group TLG1. The second sensing pads TPb may be connected to the transmitting lines TxL6 to TxL10 belonging to the second group TLG2. The third sensing pads TPc may be connected to the receiving lines RxL1 to RxL3 belonging to the first group RLG1. The fourth sensing pads TPd may be connected to the receiving lines RxL4 to RxL10 belonging to the second group RLG2.

Referring to FIG. 11C, the active area I_AAb includes a first area AA1 where deviations of the mutual capacitances between the transmitting electrodes TE1 to TE10 and the receiving electrodes RE1 to RE10 are small and a second area AA2 where the deviations of the mutual capacitances are large. The second area AA2 includes first and third sub-areas S_AA1 and S_AA3 where the mutual capacitances are relatively high and second and fourth sub-areas S_AA2 and S_AA4 where the mutual capacitances are relatively low.

In an embodiment of the present disclosure, the second area AA2 may be defined in an area where the fifth transmitting electrode TE5 and the sixth receiving electrode RE6 are disposed. The fifth transmitting electrode TE5 is connected to the fifth transmitting line TxL5 through the first end, and the sixth transmitting electrode TE6 is connected to the sixth transmitting line TxL6 through the second end. The first sub-area S_AA1 is defined as an area from the central portion of the fifth transmitting electrode TE5 to the first end of the fifth transmitting electrode TE5, and the second sub-area S_AA2 is defined as an area from the central portion of the fifth transmitting electrode TE5 to the second end of the fifth transmitting electrode TE5. The third sub-area S_AA3 is defined as an area from the central portion of the sixth transmitting electrode TE6 to the second end of the sixth transmitting electrode TE6, and the fourth sub-area S_AA4 is defined as an area from the central portion of the sixth transmitting electrode TE6 to the first end of the sixth transmitting electrode TE6. The first and fourth sub-areas S_AA1 and S_AA4 may be disposed adjacent to each other in the first direction DR1, and the second and third sub-areas S_AA2 and S_AA3 may be disposed adjacent to each other in the first direction DR1. The deviations of the mutual capacitances may be large between the first and fourth sub-areas S_AA1 and S_AA4, and the deviations of the mutual capacitances may be large between the second and third sub-areas S_AA2 and S_AA3.

The first conductive layer LCL (refer to FIG. 6B) may further include second electrostatic induction patterns ESD_P2. The second electrostatic induction patterns ESD_P2 may be formed through the same process as the bridge patterns BPa and may contain the same material as the bridge patterns BPa. The second electrostatic induction patterns ESD_P2 may contain the same metallic material as the bridge patterns BPa. The second electrostatic induction patterns ESD_P2 may contain a different material from the first sensing patterns SP1 and the second sensing patterns SP2. Alternatively, the second electrostatic induction patterns ESD_P2 may contain the same material (e.g., a transparent conductive material) as the first sensing patterns SP1 and the second sensing patterns SP2. When the second electrostatic induction patterns ESD_P2 contain a transparent conductive material, electrostatic induction characteristics may be decreased, but a phenomenon of visibility of the second electrostatic induction patterns ESD_P2 may be reduced or prevented.

At least one of the second electrostatic induction patterns ESD_P2 may have a different area from the first electrostatic induction patterns ESD_P1 (refer to FIG. 6A). In an embodiment of the present disclosure, at least one of the second electrostatic induction patterns ESD_P2 may have a larger area than the first electrostatic induction patterns ESD_P1 (refer to FIG. 6A).

In FIG. 11D, four second electrostatic induction patterns EDS_P2 are illustrated. Each of the four second electrostatic induction patterns ESD_P2 may be electrically connected to the first sensing pattern SP1. One end of each of the four second electrostatic induction patterns ESD_P2 may make direct contact with the first sensing pattern SP1, and an opposite end of each of the four second electrostatic induction pattern ESD_P2 may overlap the second sensing pattern SP2.

In the second area AA2, the second mutual capacitance Cm2 (refer to FIG. 7C) formed between the first and second sensing patterns SP1 and SP2 may be compensated for by the second vertical capacitance Cv2 (refer to FIG. 7C) formed between the second electrostatic induction patterns ESD_P2 and the second sensing pattern SP2. The second vertical capacitance Cv2 may be proportional to the overlapping area between the second electrostatic induction patterns ESD_P2 and the second sensing pattern SP2. That is, the second vertical capacitance Cv2 may be increased as the overlapping area between the second electrostatic induction patterns ESD_P2 and the second sensing pattern SP2 is increased.

In embodiments of the present disclosure, in the second area AA2, the second vertical capacitance Cv2 is not constant depending on positions. For example, in the second sub-area S_AA2, the second vertical capacitance Cv2 may become gradually higher from the central portion toward the left end (e.g., the second end) than the first vertical capacitance Cv1 (refer to FIG. 6D), and in the fourth sub-area S_AA4, the second vertical capacitance Cv2 may become gradually higher from the central portion toward the right end (e.g., the first end) than the first vertical capacitance Cv1.

In an embodiment of the present disclosure, the first electrostatic induction pattern ESD_P1 may be disposed in the first and third sub-areas S_AA1 and S_AA3. Accordingly, in the first and third sub-areas S_AA1 and S_AA3, the second vertical capacitance Cv2 may remain the same as the first vertical capacitance Cv1.

As the second vertical capacitance Cv2 is gradually increased in the second and fourth sub-areas S_AA2 and S_AA4, a compensation level of the second mutual capacitance Cm2 by the second vertical capacitance Cv2 may be increased. In the second and fourth sub-areas S_AA2 and S_AA4, the relatively low second mutual capacitance Cm2 may be compensated for by the second vertical capacitance Cv2. Accordingly, between the first and fourth sub-areas S_AA1 and S_AA4, deviations of the second mutual capacitances Cm2 may be decreased by the second vertical capacitance Cv2, and between the second and third sub-5 areas S_AA2 and S_AA3, deviations of the second mutual capacitances Cm2 may be decreased by the second vertical capacitance Cv2. Thus, a malfunction due to the deviations of the second mutual capacitances Cm2 in the second area AA2 may be prevented or reduced.

Figure 12:
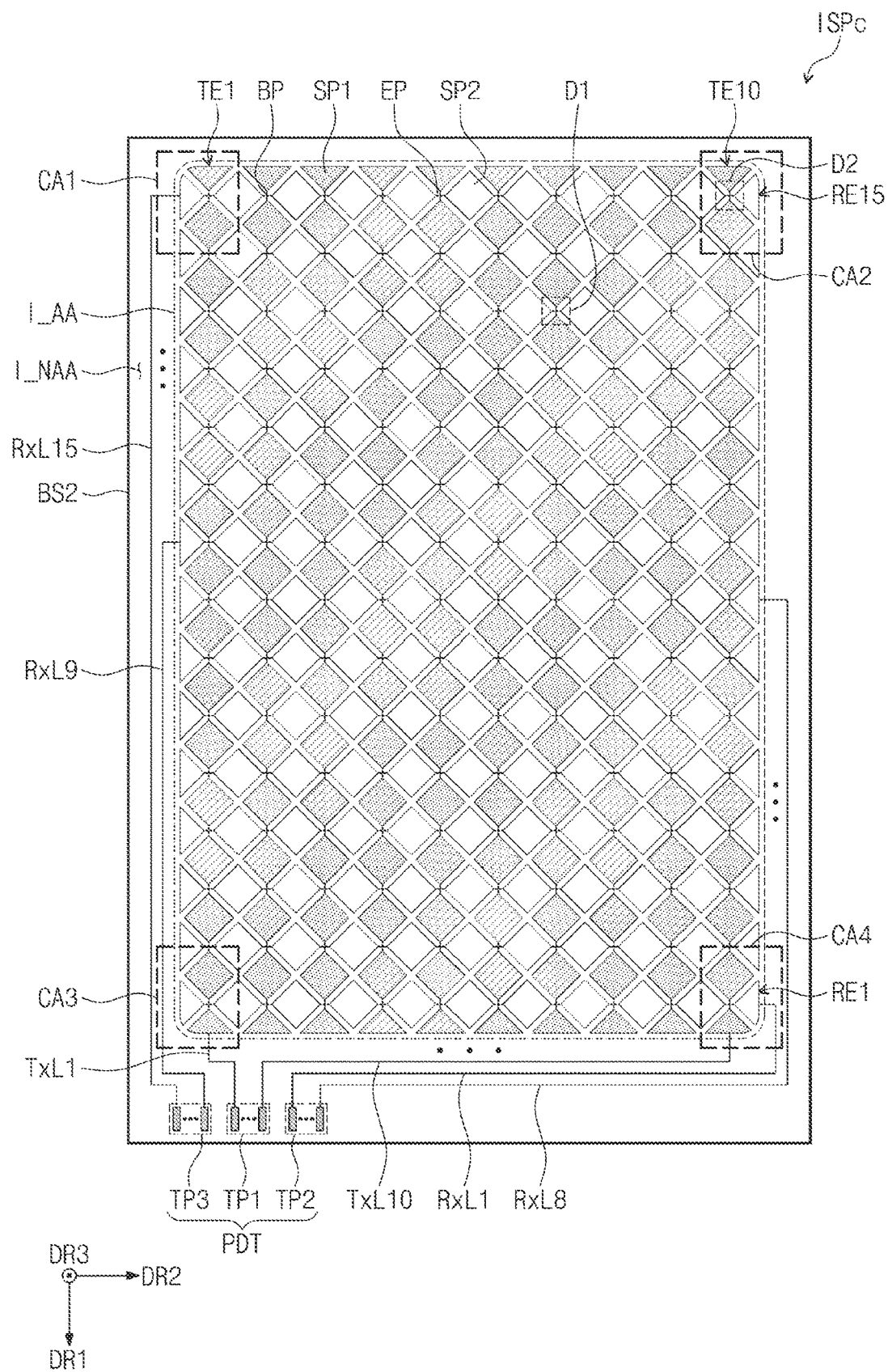
FIG. 12 is a plan view of an input sensing panel according to an embodiment of the present disclosure.
Figure 13:
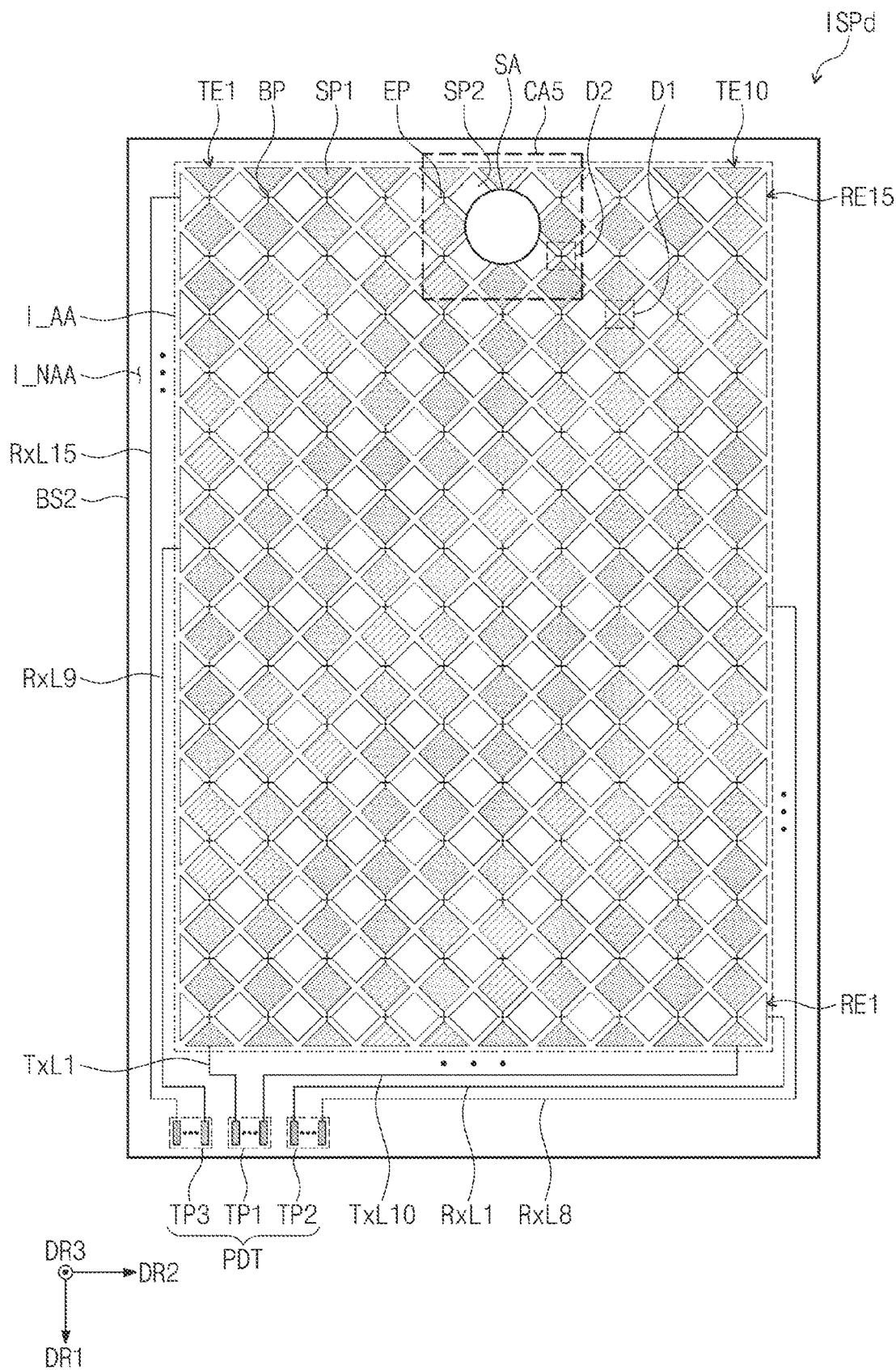
FIG. 13 is a plan view of an input sensing panel according to an embodiment of the present disclosure.
Figure 14:
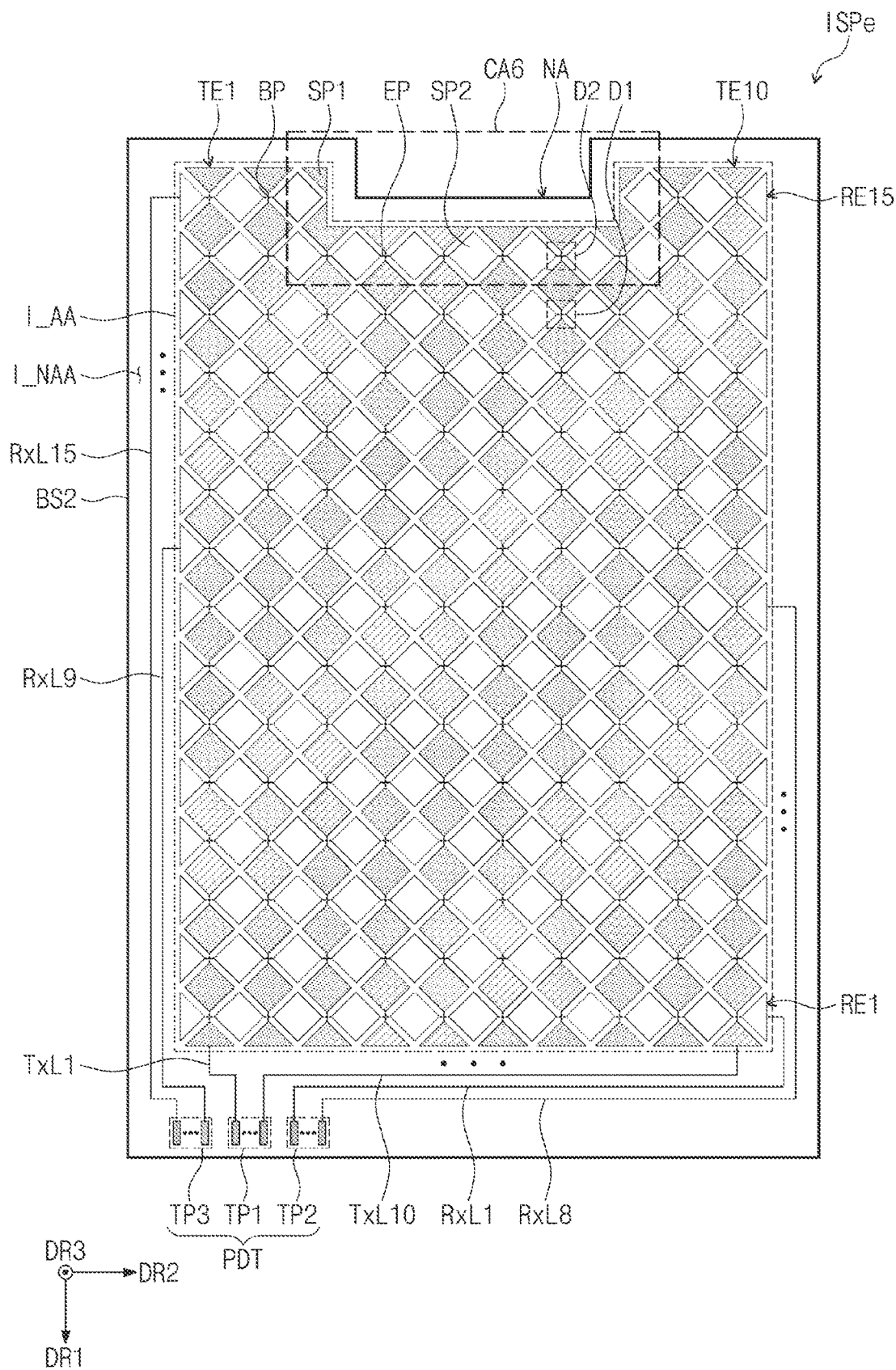
FIG. 14 is a plan view of an input sensing panel according to an embodiment of the present disclosure.

FIG. 12 is a plan view of an input sensing panel according to an embodiment of the present disclosure. FIG. 13 is a plan view of an input sensing panel according to an embodiment of the present disclosure. FIG. 14 is a plan view of an input sensing panel according to an embodiment of the present disclosure.

Referring to FIG. 12, the input sensing panel ISPc according to an embodiment of the present disclosure may include an active area I_AA and a peripheral area I_NAA disposed adjacent to the active area I_AA. The active area I_AA may have a rectangular shape with rounded corners. In an embodiment of the present disclosure, the active area I_AA may include first to fourth corner areas CA1, CA2, CA3, and CA4. In the first to fourth corner areas CA1 to CA4, the corners of the active area I_AA may have a round shape.

The input sensing panel ISPc may include a plurality of transmitting electrodes TE1 to TE10, a plurality of receiving electrodes RE1 to RE15, a plurality of transmitting lines TxL1 to TxL10, a plurality of receiving lines RxL1 to RxL15, and a plurality of sensing pads PDT.

In the first to fourth corner areas CA1 to CA4, the shapes of the plurality of transmitting electrodes TE1 to TE10 and the shapes of the plurality of receiving electrodes RE1 to RE15 may be changed depending on the shapes of the corners. That is, in the first to fourth corner areas CA1, CA2, CA3, and CA4, the sizes of some of the transmitting electrodes (e.g., the first and tenth transmitting electrodes TE1 and TE10) and the sizes of some of the receiving electrodes (e.g., the first and fifteenth receiving electrodes RE1 and RE15) may be decreased. Due to this, in each corner area (e.g., the first corner area CA1), mutual capacitance (e.g., the mutual capacitance between the first transmitting electrode TE1 and the first receiving electrode RE1) may be decreased.

Hereinafter, for convenience of description, the corner areas CA1, CA2, CA3, and CA4 having relatively low mutual capacitances may be referred to as the compensation areas, and the remaining area having relatively high mutual capacitance may be referred to as the non-compensation area.

Referring to FIG. 13, the input sensing panel ISPd according to an embodiment of the present disclosure may include an active area I_AA and a peripheral area I_NAA disposed adjacent to the active area I_AA. The active area I_AA may include a sensing area SA. The sensing area SA may have a circular shape. However, without being limited thereto, the sensing area SA may have various shapes, such as, for example, a polygonal shape, an oval shape, the shape of a figure having at least one curved side, or an irregular shape. The sensing area SA may be an area where an optical signal moves. The sensing area SA may be an area that passes an optical signal and may have a higher light transmittance than the rest of the active area I_AA. The optical signal passing through the sensing area SA may be supplied to an electro-optical module (e.g., a camera module) included in the display device DD (refer to FIG. 2).

The input sensing panel ISPd may include a plurality of transmitting electrodes TE1 to TE10, a plurality of receiving electrodes RE1 to RE15, a plurality of transmitting lines TxL1 to TxL10, a plurality of receiving lines RxL1 to RxL15, and a plurality of sensing pads PDT.

To increase the light transmittance of the sensing area SA, some of the plurality of transmitting electrodes TE1 to TE10 and some of the plurality of receiving electrodes RE1 to RE15 may be partially removed from the sensing area SA. As a result, mutual capacitance formed in an area disposed adjacent to the sensing area SA may be lower than mutual capacitance formed in an area not disposed adjacent to the sensing area SA.

Hereinafter, for convenience of description, an area CA5 that is disposed adjacent to the sensing area SA and has relatively low mutual capacitance may be referred to as the compensation area, and the remaining area having relatively high mutual capacitance may be referred to as the non-compensation area.

Referring to FIG. 14, the input sensing panel ISPe according to an embodiment of the present disclosure may include an active area I_AA and a peripheral area I_NAA disposed adjacent to the active area I_AA. The active area I_AA may include a notch area NA. One side of a second base layer BS2 may be recessed to form the notch area NA.

The input sensing panel ISPe may include a plurality of transmitting electrodes TE1 to TE10, a plurality of receiving electrodes RE1 to RE15, a plurality of transmitting lines TxL1 to TxL10, a plurality of receiving lines RxL1 to RxL15, and a plurality of sensing pads PDT.

Some of the plurality of transmitting electrodes TE1 to TE10 and some of the plurality of receiving electrodes RE1 to RE15 may be partially removed by the notch area NA. As a result, mutual capacitance formed in an area disposed adjacent to the notch area NA may be lower than mutual capacitance formed in an area not disposed adjacent to the notch area NA.

Hereinafter, for convenience of description, an area CA6 that is disposed adjacent to the notch area NA and has relatively low mutual capacitance may be referred to as the compensation area, and the remaining area having relatively high mutual capacitance may be referred to as the non-compensation area.

Figure 15A:
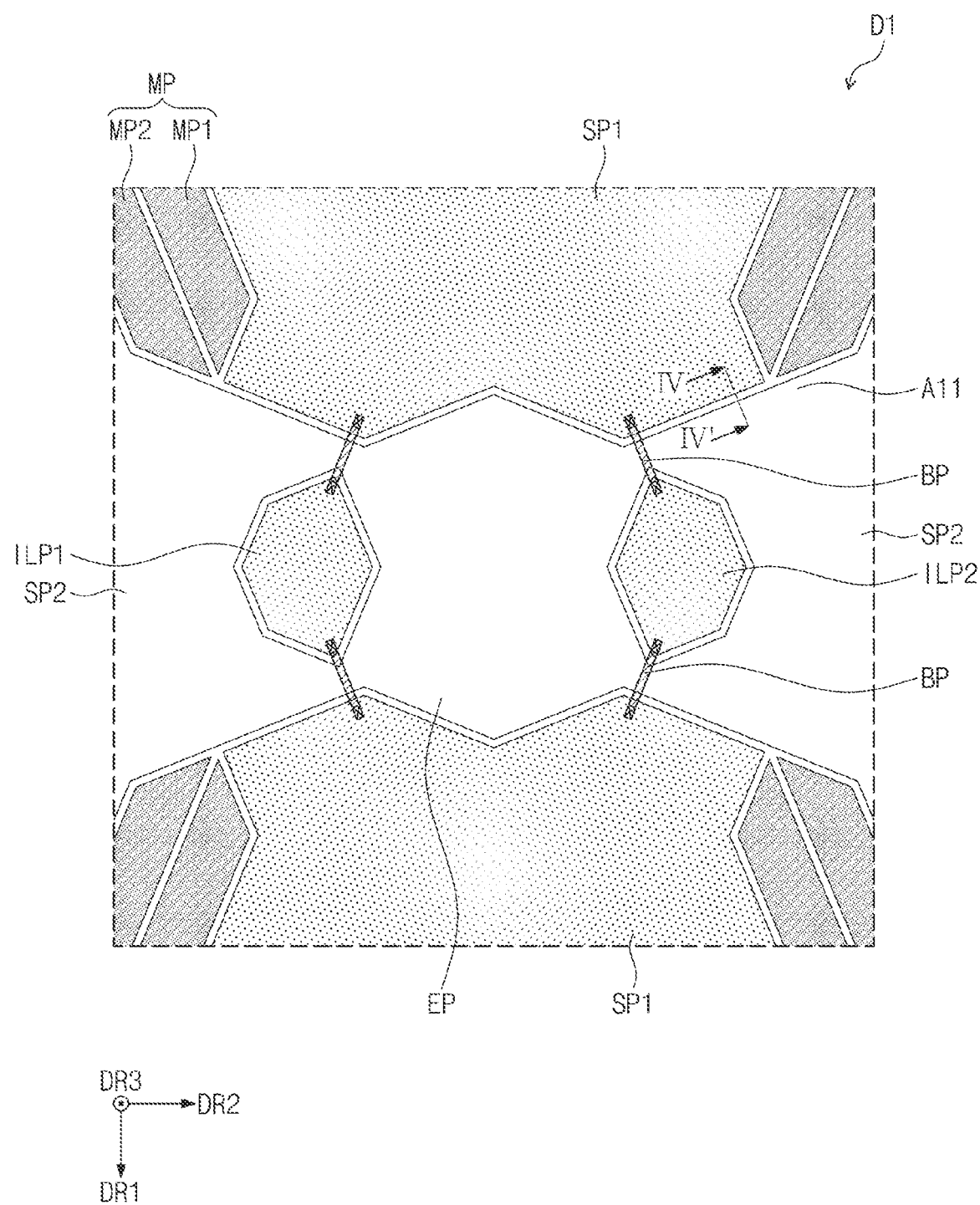
FIG. 15A is a plan view illustrating an area D1 located in a non-compensation area of FIG. 12, 13, or 14 according to an embodiment of the present disclosure.
Figure 15B:
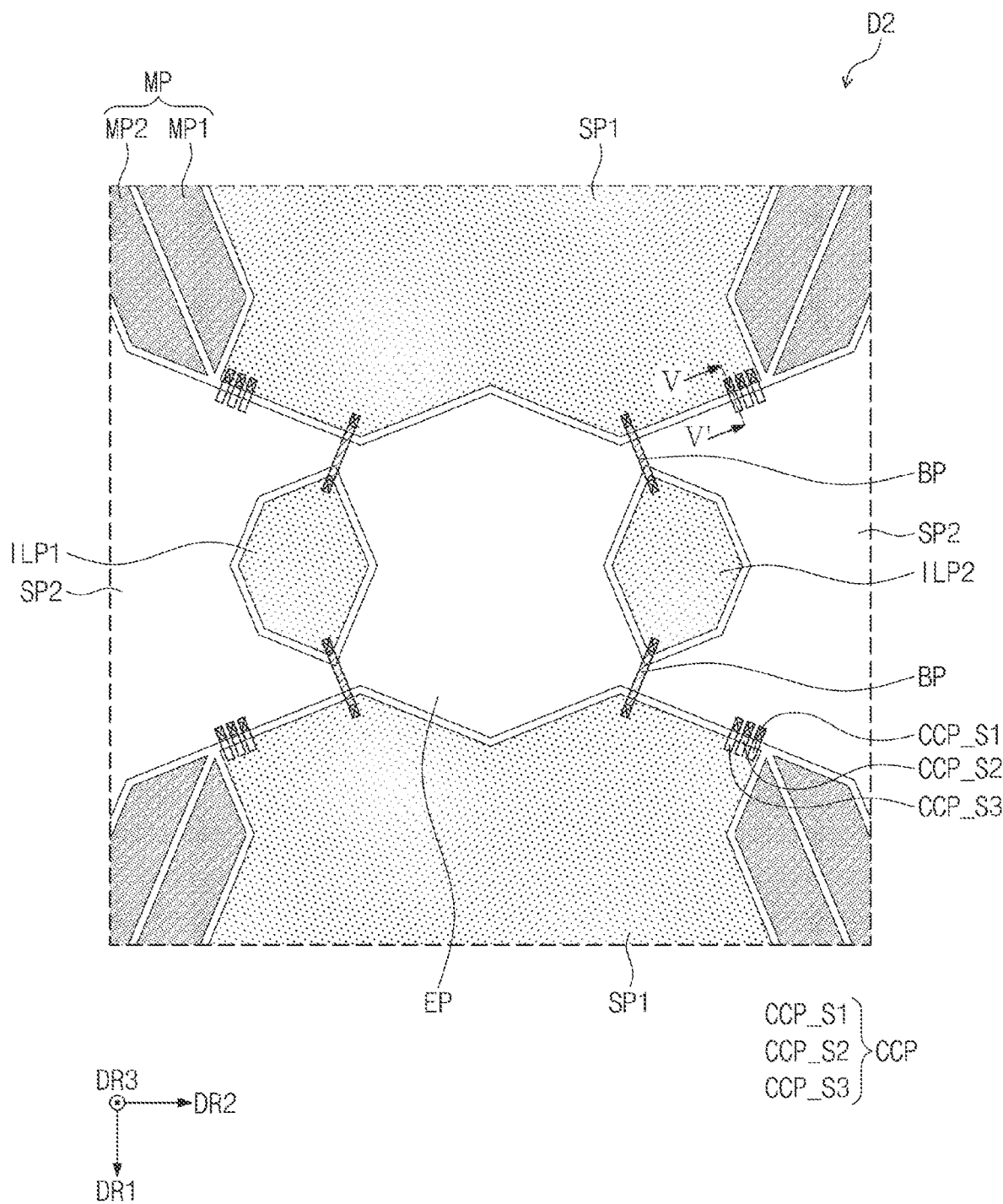
FIG. 15B is a plan view illustrating an area D2 located in a compensation area of FIG. 12, 13, or 14 according to an embodiment of the present disclosure.
Figure 16A:
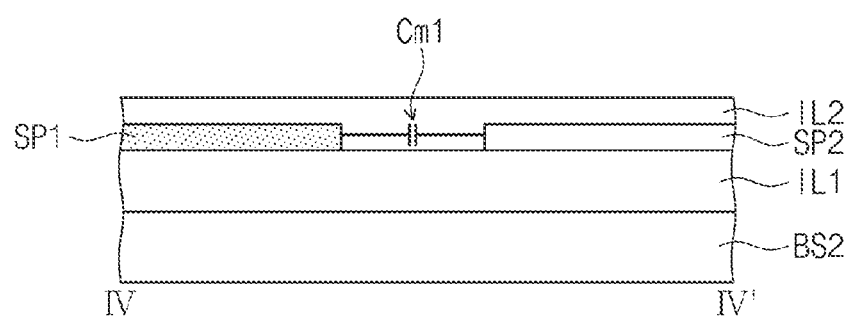
FIG. 16A is a cross-sectional view taken along line IV-IV' illustrated in FIG. 15A according to an embodiment of the present disclosure.
Figure 16B:
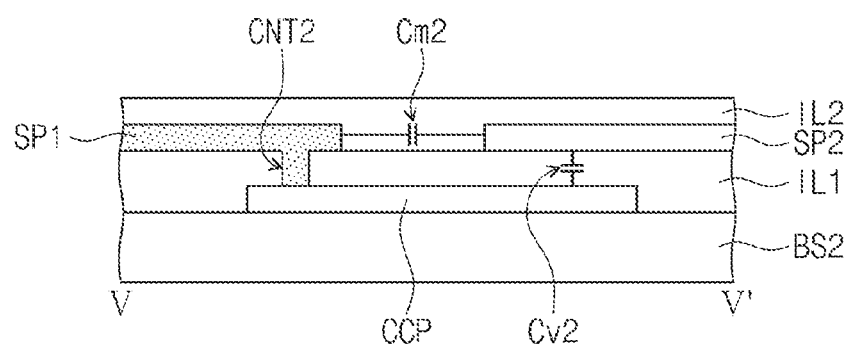
FIG. 16B is a cross-sectional view taken along line V-V' illustrated in FIG. 15B according to an embodiment of the present disclosure.

FIG. 15A is a plan view illustrating an area D1 located in the non-compensation area of FIG. 12, 13, or 14 according to an embodiment of the present disclosure. FIG. 15B is a plan view illustrating an area D2 located in the compensation area of FIG. 12, 13, or 14 according to an embodiment of the present disclosure. FIG. 16A is a cross-sectional view taken along line IV-IV' illustrated in FIG. 15A according to an embodiment of the present disclosure. FIG. 16B is a cross-sectional view taken along line V-V' illustrated in FIG. 15B according to an embodiment of the present disclosure.

Among the components illustrated in FIGS. 15A and 15B, components identical to the components illustrated in FIGS. 6A and 7A will be assigned with identical reference numerals, and for convenience of explanation, a further description thereof will be omitted.

Referring to FIGS. 15A and 16A, the mutual capacitance Cm1 formed between first and second sensing patterns SP1 and SP2 in the area D1 (that is, the non-compensation area) may be referred to as a first mutual capacitance. In an embodiment, because the first and second sensing patterns SP1 and PS2 have normal sizes in the non-compensation area, a compensation pattern for compensating for the first mutual capacitance Cm1 is not included in the non-compensation area.

Referring to FIGS. 15B and 16B, the mutual capacitance Cm2 formed between first and second sensing patterns SP1 and SP2 in the area D2 (that is, the compensation area CA1, CA2, CA3, CA4, CA5, or CA6 (refer to FIGS. 12 to 14)) may be referred to as a second mutual capacitance. Because the first and second sensing patterns SP1 and SP2 have abnormal sizes (e.g., sizes smaller than the normal sizes) in the compensation area CA1, CA2, CA3, CA4, CA5, or CA6, the second mutual capacitance Cm2 in the compensation area CA1, CA2, CA3, CA4, CA5, or CA6 may be lower than the first mutual capacitance Cm1 in the non-compensation area.

In an embodiment of the present disclosure, compensation patterns CCP for compensating for the second mutual capacitance Cm2 may be provided in the compensation area CA1, CA2, CA3, CA4, CA5, or CA6. The compensation patterns CCP may be included in a first conductive layer LCL (refer to FIG. 6B). The compensation patterns CCP may be formed through the same process as bridge patterns BP and may contain the same material as the bridge patterns BP. The compensation patterns CCP may contain the same metallic material as the bridge patterns BP. When the compensation patterns CCP contain the same metallic material as the bridge patterns BP, the compensation patterns CCP may have an electrostatic induction function. However, embodiments of the present disclosure are not limited thereto. The compensation patterns CCP may contain the same material as the first sensing patterns SP1 and the second sensing patterns SP2. For example, the compensation patterns CCP may contain a transparent conductive material.

Each of the compensation patterns CCP may include a plurality of sub-compensation patterns CCP_S1, CCP_S2, and CCP_S3. The plurality of sub-compensation patterns CCP_S1, CCP_S2, and CCP_S3 may be spaced apart from one another. The plurality of sub-compensation patterns CCP_S1, CCP_S2, and CCP_S3 may have the same size. However, this is illustrative, and the plurality of sub-compensation patterns CCP_S1, CCP_S2, and CCP_S3 may have different sizes according to embodiments of the present disclosure.

The number of sub-compensation patterns CCP_S1, CCP_S2, and CCP_S3 included in each of the compensation patterns CCP may vary depending on the shapes of the compensation areas CA1 to CA6 and may vary depending on positions in the compensation areas CA1 to CA6. Alternatively, each of the compensation patterns CCP may have one pattern structure in which the plurality of sub-compensation patterns CCP_S1, CCP_S2, and CCP_S3 are integrated. In this case, the area of each of the compensation patterns CCP may vary depending on the shapes of the compensation areas CA1 to CA6 and may vary depending on positions in the compensation areas CA1 to CA6.

The compensation patterns CCP may be covered by a first insulating layer IL1. Second contact holes CNT2 for electrically connecting the compensation patterns CCP to the first or second sensing pattern SP1 or SP2 may be provided in the first insulating layer IL1. FIG. 16B illustrates a structure in which the first sensing pattern SP1 is electrically connected to one end of the corresponding compensation pattern CCP through one second contact hole CNT2 provided in the first insulating layer IL1. The compensation pattern CCP may overlap the second sensing pattern SP2 disposed adjacent thereto.

A vertical capacitance Cv2 may be formed between the compensation pattern CCP and the second sensing pattern SP2. The vertical capacitance Cv2 formed between the compensation pattern CCP and the second sensing pattern SP2 in the compensation area CA1, CA2, CA3, CA4, CA5, or CA6 may be referred to as a second vertical capacitance. The second vertical capacitance Cv2 may be proportional to an overlapping area between the compensation pattern CCP and the second sensing pattern SP2. That is, the second vertical capacitance Cv2 may be increased as the overlapping area between the compensation pattern CCP and the second sensing pattern SP2 is increased.

As the compensation pattern CCP is electrically connected to the first sensing pattern SP1, the second vertical capacitance Cv2 may compensate for the second mutual capacitance Cm2. A compensation level of the second mutual capacitance Cm2 may be increased with an increase in the second vertical capacitance Cv2.

As described above, the second vertical capacitance Cv2 may be compensated for in the compensation area CA1, CA2, CA3, CA4, CA5, or CA6 by the compensation pattern CCP, and thus, the sensing sensitivity in the compensation area CA1, CA2, CA3, CA4, CA5, or CA6 may be increased.

Figure 17A:
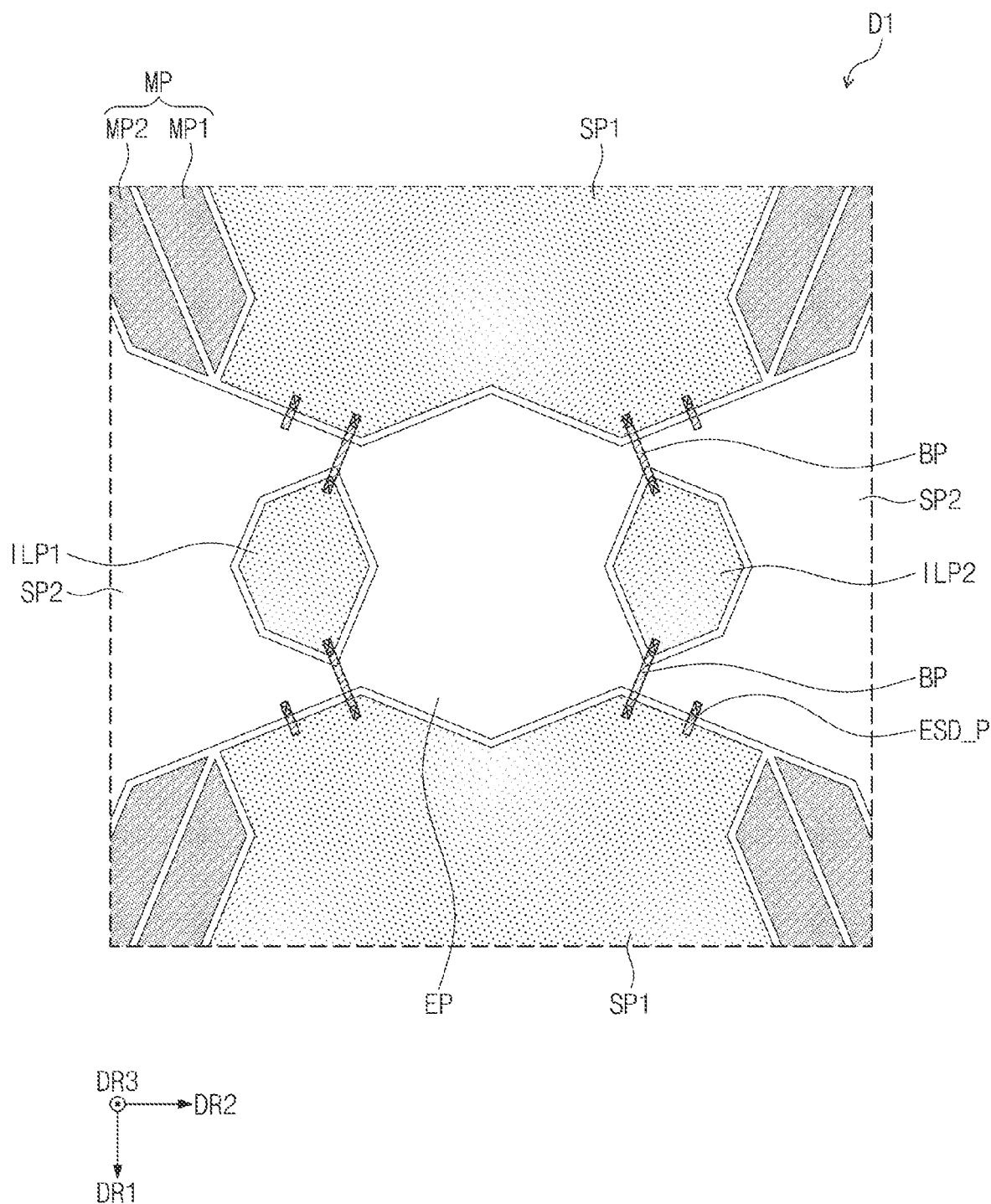
FIG. 17A is a plan view illustrating the area D1 located in the non-compensation area of FIG. 12, 13, or 14 according to an embodiment of the present disclosure.
Figure 17B:
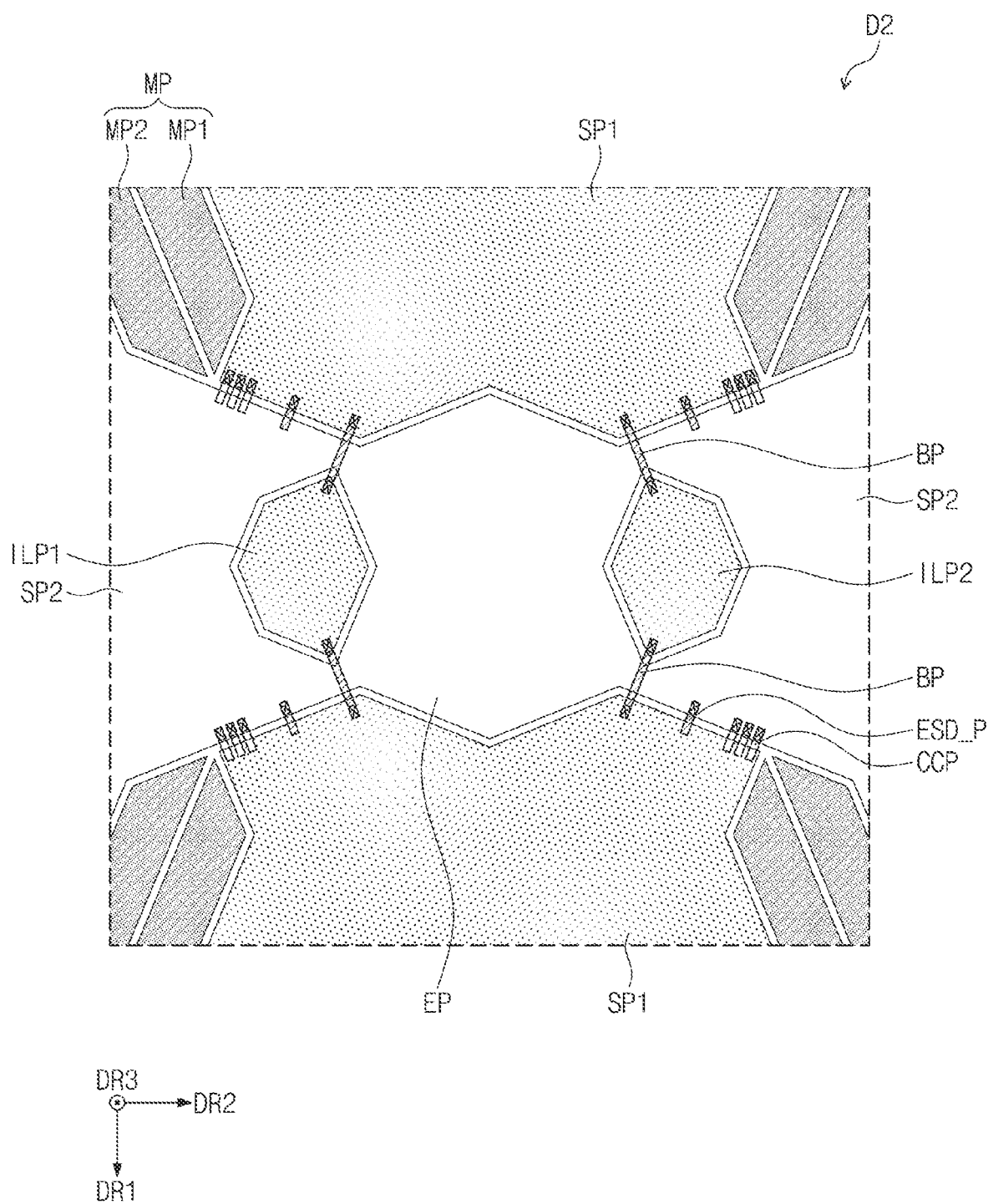
FIG. 17B is a plan view illustrating the area D2 located in the compensation area of FIG. 12, 13, or 14 according to an embodiment of the present disclosure.

FIG. 17A is a plan view illustrating the area D1 located in the non-compensation area of FIG. 12, 13, or 14 according to an embodiment of the present disclosure. FIG. 17B is a plan view illustrating the area D2 located in the compensation area of FIG. 12, 13, or 14 according to an embodiment of the present disclosure.

Among the components illustrated in FIGS. 17A and 17B, components identical to the components illustrated in FIGS. 15A and 15B will be assigned with identical reference numerals, and for convenience of explanation, a further description thereof will be omitted.

Referring to FIGS. 17A and 17B, in the non-compensation area and the compensation area CA1, CA2, CA3, CA4, CA5, or CA6 (refer to FIGS. 12 to 14), electrostatic induction patterns ESD_P may be additionally disposed between the first and second sensing patterns SP1 and SP2. The electrostatic induction patterns ESD_P may have the same structure as the first electrostatic induction patterns ESD_P1 illustrated in FIGS. 6A to 6D.

The compensation patterns CCP may contain a different material from the electrostatic induction patterns ESD_P. For example, the compensation patterns CCP may contain a transparent conductive material, and the electrostatic induction patterns ESD_P may contain a metallic material. However, embodiments of the present disclosure are not limited thereto. The compensation patterns CCP may contain the same material as the electrostatic induction patterns ESD_P. In this case, the compensation patterns CCP and the electrostatic induction patterns ESD_P may contain a metallic material. When the compensation patterns CCP contain the same metallic material as the electrostatic induction patterns ESD_P, the compensation patterns CCP may also have an electrostatic induction function.

The electrostatic induction patterns ESD_P may be commonly formed in the non-compensation area and the compensation area CA1, CA2, CA3, CA4, CA5, or CA6. Accordingly, the electrostatic induction patterns ESD_P may not be able to perform a function of compensating for the second mutual capacitance Cm2 (refer to FIG. 16B) in the compensation area CA1, CA2, CA3, CA4, CA5, or CA6.

Alternatively, the electrostatic induction patterns ESD_P may include the first electrostatic induction patterns ESD_P1 illustrated in FIG. 6A and the second electrostatic induction patterns ESD_P2 illustrated in FIG. 7A. In this case, when the second electrostatic induction patterns ESD_P2 have a larger area than the first electrostatic induction patterns ESD_P1 or the number of second electrostatic induction patterns ESD_P2 is larger than the number of first electrostatic induction patterns ESD_P1, the electrostatic induction patterns ESD_P, together with the compensation patterns CCP, may perform a function of compensating for the second mutual capacitance Cm2.

As described above, the second vertical capacitance Cv2 may be compensated for in the compensation area CA1, CA2, CA3, CA4, CA5, or CA6 by the compensation pattern CCP, and thus, the sensing sensitivity in the compensation area CA1, CA2, CA3, CA4, CA5, or CA6 may be increased.

According to embodiments of the present disclosure, the second electrostatic induction patterns larger than the first electrostatic induction patterns disposed in the first area of the input sensing panel may be disposed in the second area of the input sensing panel, or more second electrostatic induction patterns may be disposed in the second area of the input sensing panel than the first electrostatic induction patterns, and thus, deviations of mutual capacitances in the second area may be decreased. Accordingly, a malfunction of the input sensing panel due to the deviations of the mutual capacitances may be prevented or reduced.

In addition, in the compensation area where mutual capacitances are low, the compensation patterns may be disposed to compensate for the mutual capacitances. Accordingly, the sensing sensitivity of the input sensing panel may be increased, and the uniformity of the sensing sensitivity may be increased.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device, comprising:
a display panel configured to display an image; and
an input sensing panel disposed on the display panel,
wherein the input sensing panel comprises:
a plurality of first sensing electrodes;
a plurality of second sensing electrodes disposed adjacent to the first sensing electrodes; and
a plurality of electrostatic induction patterns, each of which is connected to a sensing electrode from one of the pluralities of first and second sensing electrodes and overlaps another sensing electrode from the other one of the pluralities of first and second sensing electrodes,
wherein the input sensing panel comprises a first area where deviations of mutual capacitances between the first sensing electrodes and the second sensing electrodes are relatively small, and a second area where the deviations of the mutual capacitances are relatively large, and
wherein the electrostatic induction patterns comprise:
a plurality of first electrostatic induction patterns disposed in the first area; and
a plurality of second electrostatic induction patterns disposed in the second area,
wherein the second electrostatic induction patterns have a different area from the first electrostatic induction patterns, or a number of the second electrostatic induction patterns is different from a number of the first electrostatic induction patterns.

2. The display device of claim 1, wherein the second area comprises a first sub-area where the mutual capacitances are relatively high and a second sub-area where the mutual capacitances are relatively low, and
wherein the second electrostatic induction patterns are disposed in the second sub-area.

3. The display device of claim 2, wherein the second electrostatic induction patterns have a larger area than the first electrostatic induction patterns.

4. The display device of claim 3, wherein first contact holes through which the first electrostatic induction patterns and sensing electrodes corresponding thereto from among the pluralities of first and second sensing electrodes are connected have a same size as second contact holes through which the second electrostatic induction patterns and sensing electrodes corresponding thereto from among the pluralities of first and second sensing electrodes are connected.

5. The display device of claim 3, wherein first contact holes through which the first electrostatic induction patterns and sensing electrodes corresponding thereto from among the pluralities of first and second sensing electrodes are connected have a smaller size than second contact holes through which the second electrostatic induction patterns and sensing electrodes corresponding thereto from among the pluralities of first and second sensing electrodes are connected.

6. The display device of claim 2, wherein each of the second electrostatic induction patterns comprises a plurality of sub-electrostatic induction patterns, and
wherein the sub-electrostatic induction patterns have a same size as the first electrostatic induction patterns.

7. The display device of claim 6, wherein the sub-electrostatic induction patterns comprise:
a first sub-electrostatic induction pattern connected to one of the first sensing electrodes and overlapping one of the second sensing electrodes; and
a second sub-electrostatic induction pattern connected to one of the second sensing electrodes and overlapping one of the first sensing electrodes.

8. The display device of claim 7, wherein the first sub-electrostatic induction pattern and the second sub-electrostatic induction pattern are alternately disposed.

9. The display device of claim 1, wherein the input sensing panel further comprises:
a bridge pattern connecting two first sensing electrodes disposed adjacent to each other, and
wherein the bridge pattern comprises a same material as the first and second electrostatic induction patterns.

10. The display device of claim 9, wherein the pluralities of first and second sensing electrodes comprise a different material from the pluralities of first and second electrostatic induction patterns.

11. The display device of claim 10, wherein the pluralities of first and second sensing electrodes comprise a transparent conductive material, and
wherein the pluralities of first and second electrostatic induction patterns comprise a metallic material.

12. The display device of claim 1, wherein the input sensing panel further comprises:
a plurality of first signal lines connected to ends of the first sensing electrodes; and
a plurality of second signal lines connected to ends of the second sensing electrodes.

13. The display device of claim 12, wherein in the second area,
a first group of first sensing electrodes among the first sensing electrodes are connected, at first ends, to a first group of first signal lines among the first signal lines, and
a second group of first sensing electrodes among the first sensing electrodes are connected, at second ends opposite to the first ends, to a second group of first signal lines among the first signal lines.

14. The display device of claim 13, wherein the second area comprises:
a first sub-area where the first ends of the first group of first sensing electrodes and the second ends of the second group of first sensing electrodes are disposed and the mutual capacitances are relatively high; and a second sub-area where second ends of the first group of first sensing electrodes and first ends of the second group of first sensing electrodes are disposed and the mutual capacitances are relatively low, and wherein the second electrostatic induction patterns are disposed in the second sub-area.

15. The display device of claim 14, wherein the second electrostatic induction patterns have a larger area than the first electrostatic induction patterns.

16. The display device of claim 14, wherein each of the second electrostatic induction patterns comprises a plurality of sub-electrostatic induction patterns, and wherein the sub-electrostatic induction patterns have a same size as the first electrostatic induction patterns.

17. A display device, comprising:

a display panel configured to display an image; and an input sensing panel disposed on the display panel, wherein the input sensing panel comprises:

a plurality of first sensing electrodes;

a plurality of second sensing electrodes disposed adjacent to the first sensing electrodes;

a plurality of compensation patterns, each of which is connected to a sensing electrode from one of the pluralities of first and second sensing electrodes and overlaps another sensing electrode from the other one of the pluralities first and second sensing electrodes; and a non-compensation area where mutual capacitances between the first sensing electrodes and the second sensing electrodes are relatively high and a compensation area where the mutual capacitances are relatively low, wherein the compensation patterns are disposed in the compensation area and are not disposed in the non-compensation area.

18. The display device of claim 17, wherein the compensation patterns comprise a same material as the pluralities of first and second sensing electrodes.

19. The display device of claim 18, wherein the compensation patterns and the pluralities of first and second sensing electrodes comprise a transparent conductive material.

20. The display device of claim 17, wherein each of the compensation patterns comprises a plurality of sub-compensation patterns spaced apart from one another.

21. The display device of claim 17, wherein the input sensing panel further comprises:

a bridge pattern connecting two first sensing electrodes disposed adjacent to each other, and wherein the bridge pattern comprises a same material as the compensation patterns.

22. The display device of claim 17, further comprising:

a plurality of electrostatic induction patterns, each of which is connected to a sensing electrode from one of the pluralities of first and second sensing electrodes and overlaps another sensing electrode from the other one of the pluralities of first and second sensing electrodes, wherein the electrostatic induction patterns are commonly disposed in the compensation area and the non-compensation area.

23. The display device of claim 22, wherein in the compensation area, the electrostatic induction patterns are spaced apart from the compensation patterns.

24. The display device of claim 22, wherein the electrostatic induction patterns comprise a different material from the compensation patterns.

25. The display device of claim 24, wherein the electrostatic induction patterns comprise a metallic material, and wherein the compensation patterns comprise a transparent conductive material.

26. A display device, comprising:

a display panel configured to display an image; and an input sensing panel disposed on the display panel, wherein the input sensing panel comprises:

a plurality of first sensing electrodes;

a plurality of second sensing electrodes disposed adjacent to the first sensing electrodes; and a plurality of electrostatic induction patterns, each of which is connected to a sensing electrode from one of the pluralities of first and second sensing electrodes and overlaps another sensing electrode from the other one of the pluralities of first and second sensing electrodes;

a non-compensation area where mutual capacitances between the first sensing electrodes and the second sensing electrodes are relatively high and a compensation area where the mutual capacitances are relatively low, wherein the electrostatic induction patterns comprise:

a plurality of first electrostatic induction patterns disposed in the non-compensation area; and a plurality of second electrostatic induction patterns disposed in the compensation area, wherein the second electrostatic induction patterns have a different area from the first electrostatic induction patterns, or a number of the second electrostatic induction patterns is different from a number of the first electrostatic induction patterns.

27. The display device of claim 26, wherein the second electrostatic induction patterns have a larger area than the first electrostatic induction patterns.

28. The display device of claim 27, wherein first contact holes through which the first electrostatic induction patterns and sensing electrodes corresponding thereto from among the pluralities of first and second sensing electrodes are connected have a same size as second contact holes through which the second electrostatic induction patterns and sensing electrodes corresponding thereto from among the pluralities of first and second sensing electrodes are connected.

29. The display device of claim 28, wherein first contact holes through which the first electrostatic induction patterns and sensing electrodes corresponding thereto from among the pluralities of first and second sensing electrodes are connected have a smaller size than second contact holes through which the second electrostatic induction patterns and sensing electrodes corresponding thereto from among the pluralities of first and second sensing electrodes are connected.

30. The display device of claim 26, wherein each of the second electrostatic induction patterns comprises a plurality of sub-electrostatic induction patterns, and wherein the sub-electrostatic induction patterns have a same size as the first electrostatic induction patterns.

* * * * *